US011934660B1

(12) United States Patent
McMullan et al.

(10) Patent No.: US 11,934,660 B1
(45) Date of Patent: Mar. 19, 2024

(54) TIERED DATA STORAGE WITH EPHEMERAL AND PERSISTENT TIERS

(71) Applicant: Qumulo, Inc., Seattle, WA (US)

(72) Inventors: Matthew Christopher McMullan, Bellevue, WA (US); Aaron James Passey, San Rafael, CA (US); Jonathan Michael MacLaren, Seattle, WA (US); Yuxi Bai, Seattle, WA (US); Thomas Gregory Rothschilds, Seattle, WA (US); Michael Anthony Chmiel, Seattle, WA (US); Tyler Morrison Moody, Seattle, WA (US); Pathirat Kosakanchit, Seattle, WA (US); Rowan Arthur Phipps, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 18/503,918

(22) Filed: Nov. 7, 2023

(51) Int. Cl.
*G06F 3/06* (2006.01)

(52) U.S. Cl.
CPC .......... *G06F 3/0613* (2013.01); *G06F 3/0607* (2013.01); *G06F 3/064* (2013.01); *G06F 3/0644* (2013.01); *G06F 3/0683* (2013.01)

(58) Field of Classification Search
CPC ...... G06F 3/0613; G06F 3/0607; G06F 3/064; G06F 3/0644; G06F 3/0683
See application file for complete search history.

(56) References Cited

U.S. PATENT DOCUMENTS

| | | | |
|---|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 17/062,500 dated Jun. 13, 2023, 8 Pages.

(Continued)

*Primary Examiner* — Khoa D Doan
(74) *Attorney, Agent, or Firm* — John W. Branch; Branch Partners PLLC

(57) ABSTRACT

Embodiments are directed to tiered data store with persistent layers. A write tier in the file system for storing in a file system. A value for a performance metric that corresponds to write requests to the file system may be predicted based on characteristics of the write requests such that the performance metric may be determined based on a plurality of interactions with the write tier. The predicted value that exceeds a threshold value of the performance metric may be employed to cause performance of further actions, including: queuing a portion of the write requests in a memory buffer based on the predicted value and the threshold value; combining the queued portion of the write requests into s;

(Continued)

storing the data segments in the write tier such that a measured value of the performance metric may be less than the threshold value.

30 Claims, 16 Drawing Sheets

(56) References Cited

U.S. PATENT DOCUMENTS

| | | | |
|---|---|---|---|
| 5,410,719 A | 4/1995 | Shackleford |
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 * | 2/2022 | Brewer ............... G06F 12/0802 |
| 11,256,682 B2 | 2/2022 | Taron et al. |
| 11,265,262 B1 | 3/2022 | Makie et al. |
| 11,294,604 B1 | 4/2022 | McMullan et al. |
| 11,294,718 B2 | 4/2022 | Bai et al. |
| 11,347,699 B2 | 5/2022 | Carpenter et al. |

(56) References Cited

U.S. PATENT DOCUMENTS

| | | |
|---|---|---|
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | Macintyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |

(56) References Cited

U.S. PATENT DOCUMENTS

| | | |
|---|---|---|
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |

(56) References Cited

U.S. PATENT DOCUMENTS

| | | | |
|---|---|---|---|
| 2023/0106208 A1* | 4/2023 | Nossenson | G06F 3/0604 |
| | | | 711/154 |
| 2023/0342053 A1* | 10/2023 | Varghese | G06F 3/0656 |
| 2024/0020268 A1 | 1/2024 | Haber et al. | |

FOREIGN PATENT DOCUMENTS

| | | |
|---|---|---|
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |
| WO | 2016/205752 A1 | 12/2016 |
| WO | 2021/151107 A1 | 7/2021 |
| WO | 2021/189055 A2 | 9/2021 |

OTHER PUBLICATIONS

Office Communication for U.S. Appl. No. 18/070,705 dated Jun. 20, 2023, 16 Pages.
Office Communication for U.S. Appl. No. 18/070,705 dated Feb. 23, 2023, 14 Pages.
Office Communication for U.S. Appl. No. 17/062,500 dated Feb. 27, 2023, 23 Pages.
Office Communication for U.S. Appl. No. 17/954,640 dated Mar. 15, 2023, 9 Pages.
Office Communication for U.S. Appl. No. 17/864,190 dated Apr. 28, 2023, 5 Pages.
Office Communication for U.S. Appl. No. 17/973,944 dated May 10, 2023, 9 Pages.
Office Communication for U.S. Appl. No. 17/115,529 dated May 22, 2023, 25 Pages.
Office Communication for U.S. Appl. No. 17/864,190 dated Jan. 24, 2023, 12 Pages.
Office Communication for U.S. Appl. No. 17/588,120 dated Feb. 1, 2023, 15 Pages.
Office Communication for U.S. Appl. No. 17/864,190 dated Sep. 19, 2022, 10 Pages.
Office Communication for U.S. Appl. No. 17/062,500 dated Oct. 5, 2022, 4 Pages.
Office Communication for U.S. Appl. No. 17/203,452 dated Oct. 19, 2022, 9 Pages.
Office Communication for U.S. Appl. No. 17/588,120 dated Oct. 21, 2022, 5 Pages.
Office Communication for U.S. Appl. No. 17/203,452 dated Nov. 9, 2022, 2 Pages.
Office Communication for U.S. Appl. No. 17/588,895 dated Nov. 9, 2022, 11 Pages.
Office Communication for U.S. Appl. No. 17/954,640 dated Nov. 30, 2022, 10 Pages.
Office Communication for U.S. Appl. No. 17/115,529 dated Dec. 9, 2022, 21 Pages.
Office Communication for U.S. Appl. No. 17/484,167 dated May 17, 2022, 3 Pages.
Office Communication for U.S. Appl. No. 17/484,167 dated Jun. 10, 2022, 5 Pages.
Office Communication for U.S. Appl. No. 17/203,452 dated Jun. 22, 2022, 22 Pages.
Office Communication for U.S. Appl. No. 14/595,598 dated Jul. 13, 2022, 9 Pages.
Office Communication for U.S. Appl. No. 17/062,500 dated Jul. 26, 2022, 20 Pages.
Office Communication for U.S. Appl. No. 17/588,120 dated Jul. 27, 2022, 34 Pages.
Office Communication for U.S. Appl. No. 17/190,653 dated Aug. 2, 2022, 8 Pages.
Office Communication for U.S. Appl. No. 17/115,529 dated Aug. 8, 2022, 21 Pages.
Office Communication for U.S. Appl. No. 17/588,895 dated Aug. 12, 2022, 12 Pages.
Office Communication for U.S. Appl. No. 17/203,452 dated Sep. 8, 2022, 4 Pages.
Office Communication for U.S. Appl. No. 17/504,289 dated Mar. 28, 2022, 9 Pages.
Office Communication for U.S. Appl. No. 17/588,120 dated Apr. 11, 2022, 36 Pages.
Office Communication for U.S. Appl. No. 17/588,895 dated Apr. 27, 2022, 6 Pages.
Office Communication for U.S. Appl. No. 17/190,653 dated Apr. 28, 2022, 13 Pages.
Office Communication for U.S. Appl. No. 17/510,043 dated Apr. 29, 2022, 10 Pages.
Office Communication for U.S. Appl. No. 17/115,529 dated Apr. 29, 2022, 4 Pages.
Office Communication for U.S. Appl. No. 17/190,653 dated Dec. 21, 2021, 12 Pages.
Office Communication for U.S. Appl. No. 14/595,598 dated Dec. 29, 2021, 19 Pages.
Office Communication for U.S. Appl. No. 17/062,500 dated Jan. 7, 2022, 4 Pages.
Office Communication for U.S. Appl. No. 16/741,567 dated Jan. 11, 2022, 6 Pages.
Office Communication for U.S. Appl. No. 17/203,452 dated Jan. 14, 2022, 4 Pages.
Office Communication for U.S. Appl. No. 17/510,043 dated Jan. 21, 2022, 13 Pages.
Office Communication for U.S. Appl. No. 16/741,567 dated Feb. 7, 2022, 8 Pages.
Office Communication for U.S. Appl. No. 17/530,420 dated Feb. 10, 2022, 24 Pages.
Office Communication for U.S. Appl. No. 16/004,182 dated Feb. 18, 2022, 11 Pages.
Office Communication for U.S. Appl. No. 17/115,529 dated Feb. 18, 2022, 20 Pages.
Office Communication for U.S. Appl. No. 17/203,452 dated Feb. 24, 2022, 14 Pages.
Office Communication for U.S. Appl. No. 17/484,167 dated Mar. 11, 2022, 11 Pages.
Office Communication for U.S. Appl. No. 17/062,500 dated Mar. 22, 2022, 19 Pages.
Office Communication for U.S. Appl. No. 16/152,277 dated Oct. 18, 2021, 5 Pages.
International Search Report and Written Opinion for International Patent Application No. PCT/US2021/023525 dated Oct. 12, 2021, 6 Pages.
Office Communication for U.S. Appl. No. 17/115,529 dated Oct. 22, 2021, 20 Pages.
International Search Report and Written Opinion for International Patent Application No. PCT/US2021/023531 dated Jul. 6, 2021, 6 Pages.
Office Communication for U.S. Appl. No. 17/062,500 dated Jul. 12, 2021, 18 Pages.
Office Communication for U.S. Appl. No. 16/775,041 dated Jul. 21, 2021, 11 Pages.
Office Communication for U.S. Appl. No. 17/114,384 dated Aug. 3, 2021, 4 Pages.
Office Communication for U.S. Appl. No. 14/595,598 dated Aug. 6, 2021, 20 Pages.
Office Communication for U.S. Appl. No. 17/115,529 dated Aug. 12, 2021, 4 Pages.
Office Communication for U.S. Appl. No. 17/190,653 dated Aug. 27, 2021, 11 Pages.
Office Communication for U.S. Appl. No. 17/114,384 dated Sep. 2, 2021, 5 Pages.
Office Communication for U.S. Appl. No. 16/152,277 dated Sep. 3, 2021, 4 Pages.

(56) References Cited

OTHER PUBLICATIONS

Office Communication for U.S. Appl. No. 16/004,182 dated Sep. 10, 2021, 4 Pages.
Office Communication for U.S. Appl. No. 16/004,182 dated Sep. 29, 2021, 11 Pages.
Office Communication for U.S. Appl. No. 17/491,017 dated Dec. 23, 2021, 41 Pages.
Office Communication for U.S. Appl. No. 17/491,017 dated May 12, 2022, 50 Pages.
Office Communication for U.S. Appl. No. 17/491,017 dated Sep. 15, 2022, 55 Pages.
Office Communication for U.S. Appl. No. 17/491,017 dated Feb. 10, 2023, 55 Pages.
Office Communication for U.S. Appl. No. 17/491,017 dated Aug. 8, 2023, 13 Pages.
Office Communication for U.S. Appl. No. 14/595,598 dated May 16, 2019, 18 Pages.
Office Communication for U.S. Appl. No. 16/152,277 dated Oct. 26, 2021, 2 Pages.
Office Communication for U.S. Appl. No. 16/004,182 dated Mar. 17, 2022, 3 Pages.
Office Communication for U.S. Appl. No. 16/226,587 dated Jan. 27, 2020, 13 Pages.
Office Communication for U.S. Appl. No. 16/741,567 dated Feb. 24, 2022, 2 Pages.
Office Communication for U.S. Appl. No. 16/234,334 dated Oct. 11, 2019, 16 Pages.
Office Communication for U.S. Appl. No. 16/262,790 dated Nov. 8, 2019, 5 Pages.
Office Communication for U.S. Appl. No. 17/504,289 dated Apr. 20, 2022, 2 Pages.
Office Communication for U.S. Appl. No. 16/659,488 dated May 6, 2020, 8 Pages.
International Preliminary Report on Patentability Chapter I for International Patent Application No. PCT/US2021/023531 dated Aug. 4, 2022, 5 Pages.
International Preliminary Report on Patentability Chapter I for International Patent Application No. PCT/US2021/023525 dated Aug. 4, 2022, 5 Pages.
International Preliminary Report on Patentability Chapter I for International Patent Application No. PCT/US2016/038242 dated Dec. 28, 2017, 8 Pages.
Office Action for European Patent Application No. 17206518.7 dated Mar. 15, 2022, 5 Pages.
Intention to Grant for European Patent Application No. 17206518.7 dated Sep. 30, 2022, 6 Pages.
Office Communication for U.S. Appl. No. 17/508,869 dated Mar. 8, 2022, 2 Pages.
Office Communication for U.S. Appl. No. 17/508,869 dated Jan. 5, 2022, 3 Pages.
Office Communication for U.S. Appl. No. 17/508,869 dated Dec. 22, 2021, 9 Pages.
Office Communication for U.S. Appl. No. 17/530,420 dated May 4, 2022, 3 Pages.
Office Communication for U.S. Appl. No. 17/530,420 dated May 12, 2022, 3 Pages.
Office Communication for European Patent Application No. 16812585.4 dated Apr. 1, 2021, 9 pages.
Intention to Grant for European Patent Application No. 18155779.4 dated Jun. 12, 2020, 10 Pages.
Office Communication for U.S. Appl. No. 17/115,529 dated Sep. 12, 2023, 25 Pages.
Office Communication for U.S. Appl. No. 17/491,017 dated May 4, 2023, 6 Pages.
Office Communication for U.S. Appl. No. 17/491,017 dated Aug. 17, 2022, 5 Pages.
Office Communication for U.S. Appl. No. 17/864,190 dated Aug. 25, 2023, 12 Pages.
Office Communication for U.S. Appl. No. 18/070,705 dated Sep. 7, 2023, 5 Pages.
Office Communication for European Patent Application No. 18155779.4 dated Apr. 17, 2018, 4 Pages.
Office Communication for U.S. Appl. No. 17/864,190 dated Nov. 17, 2023, 12 Pages.
Office Communication for U.S. Appl. No. 14/859,114 dated Jun. 27, 2018, 33 pages.
Office Communication for U.S. Appl. No. 14/859,114 dated Nov. 19, 2018, 35 Pages.
Office Communication for U.S. Appl. No. 14/859,114 dated Jan. 31, 2019, 4 Pages.
Office Communication for U.S. Appl. No. 14/859,114 dated Mar. 7, 2019, 32 Pages.
Office Communication for U.S. Appl. No. 14/859,114 dated Jun. 26, 2019, 21 Pages.
Office Communication for U.S. Appl. No. 14/859,114 dated Sep. 13, 2019, 6 Pages.
Office Communication for U.S. Appl. No. 14/859,114 dated Nov. 26, 2019, 21 Pages.
Office Communication for U.S. Appl. No. 15/288,853 dated Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, 25 Pages.
Cudre-Mauroux, Philippe et al., "TrajStore an Adaptive Storage System for Very Lar ie Trajectoly Sets", ICDE 2010, Long Beach, CA, Mar. 1-6, 2010, pp. 109-120.
Office Communication for U.S. Appl. No. 16/436,825 dated Jul. 11, 2019, 9 Pages.
Office Communication for U.S. Appl. No. 15/474,047 dated Sep. 18, 2017, 14 Pages.
Office Communication for U.S. Appl. No. 15/474,047 dated Mar. 9, 2018, 8 Pages.
Office Communication for U.S. Appl. No. 15/474,047 dated Jun. 11, 2018, 6 Pages.
Office Communication for U.S. Appl. No. 15/474,047 dated Aug. 15, 2018, 11 Pages.
Office Communication for U.S. Appl. No. 15/957,809 dated Jun. 28, 2018, 27 Pages.
Office Communication for U.S. Appl. No. 15/957,809 dated Jan. 24, 2019, 11 Pages.
Office Communication for U.S. Appl. No. 16/434,157 dated Jul. 25, 2019, 8 Pages.
Office Communication for U.S. Appl. No. 15/854,447 dated May 6, 2019, 9 pages.
Office Communication for U.S. Appl. No. 16/505,562 dated Aug. 30, 2019, 11 Pages.
Extended European Search Report for European Patent Application No. 17206518.7 dated Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, 46 Pages.
Office Communication for U.S. Appl. No. 16/125,573 dated Nov. 21, 2019, 13 Pages.
Office Communication for U.S. Appl. No. 16/226,587 dated Oct. 24, 2019, 4 Pages.
Office Communication for U.S. Appl. No. 16/262,790 dated Dec. 12, 2019, 10 Pages.
Office Communication for U.S. Appl. No. 16/234,334 dated Jan. 16, 2020, 8 Pages.
Office Communication for U.S. Appl. No. 15/694,604 dated Nov. 20, 2019, 8 Pages.
Office Communication for U.S. Appl. No. 16/262,756 dated Jan. 28, 2020, 21 Pages.
Office Communication for U.S. Appl. No. 16/434,157 dated Jan. 29, 2020, 9 Pages.
Office Communication for U.S. Appl. No. 16/262,790 dated Feb. 6, 2020, 8 Pages.

(56) References Cited

OTHER PUBLICATIONS

Office Communication for U.S. Appl. No. 14/859,114 dated Mar. 13, 2020, 21 Pages.
Office Communication for U.S. Appl. No. 16/752,451 dated Mar. 12, 2020, 14 Pages.
Office Communication for U.S. Appl. No. 16/775,041 dated Mar. 11, 2020, 8 pages.
Office Communication for U.S. Appl. No. 16/779,362 dated Mar. 26, 2020, 10 Pages.
Wikipedia clustered file system page from elate Jul. 9, 2019, retrieved using the WayBackMachine, From https//web.archive.org/web/20190709083400/tlttps://en.wikipedia.org/wiki/Clustered_fiie_system (Year: 2019), pp. 1-6.
Wikipedia raft page from date Jul. 16, 2019, retrieved using the WayBackMachine, from tlttps://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, 4 Pages.
Office Communication for U.S. Appl. No. 16/752,509 dated Apr. 2, 2020, 8 Pages.
Office Communication for U.S. Appl. No. 16/152,277 dated Apr. 3, 2020, 10 Pages.
Office Communication for U.S. Appl. No. 16/004,182 dated Apr. 28, 2020, 51 Pages.
Office Communication for U.S. Appl. No. 16/152,259 dated Apr. 29, 2020, 19 Pages.
Office Communication for U.S. Appl. No. 14/859,114 dated Jun. 5, 2020, 5 Pages.
Office Communication for U.S. Appl. No. 16/262,756 dated Jun. 8, 2020, 22 Pages.
Office Communication for U.S. Appl. No. 14/595,598 dated Jul. 9, 2020, 19 Pages.
Office Communication for U.S. Appl. No. 16/752,451 dated Jul. 23, 2020, 8 Pages.
Office Communication for U.S. Appl. No. 14/859,114 dated Jul. 23, 2020, 21 Pages.
Office Communication for U.S. Appl. No. 16/152,615 dated Aug. 6, 2020, 7 Pages.
Office Communication for U.S. Appl. No. 16/779,362 dated Aug. 7, 2020, 11 Pages.
Office Communication for U.S. Appl. No. 16/883,922 dated Aug. 7, 2020, 13 Pages.
Office Communication for U.S. Appl. No. 16/775,041 dated Aug. 18, 2020, 9 Pages.
Office Communication for U.S. Appl. No. 16/883,879 dated Sep. 1, 2020, 11 Pages.
Extended European Search Report for European Patent Application No. 16812585.4 dated Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, 6 Pages.
International Search Report and Written Opinion for International Patent Application No. PCT/US2016/038242 dated Oct. 11, 2016, 9 Pages.
Office Communication for U.S. Appl. No. 14/595,598 dated Jul. 31, 2019, 5 Pages.
Office Communication for U.S. Appl. No. 14/595,598 dated Sep. 20, 2018, 18 Pages.
Office Communication for U.S. Appl. No. 14/595,598 dated Dec. 15, 2017, 18 Pages.
Office Communication for U.S. Appl. No. 14/595,598 dated Feb. 24, 2017, 8 Pages.
Office Communication for U.S. Appl. No. 14/595,598 dated Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, 7 Pages.
Office Communication for European Patent Application No. 18155779.4 dated Oct. 8, 2019, 4 Pages.
Office Communication for U.S. Appl. No. 16/152,259 dated Aug. 28, 2020, 5 Pages.
Office Communication for U.S. Appl. No. 16/752,509 dated Aug. 11, 2020, 7 Pages.
Office Communication for U.S. Appl. No. 14/595,598 dated Sep. 25, 2020, 7 Pages.
Office Communication for U.S. Appl. No. 16/152,277 dated Oct. 16, 2020, 10 Pages.
Office Communication for U.S. Appl. No. 16/152,615 dated Oct. 20, 2020, 7 Pages.
Office Communication for U.S. Appl. No. 16/775,041 dated Nov. 3, 2020, 5 Pages.
Office Communication for U.S. Appl. No. 17/062,500 dated Nov. 12, 2020, 12 Pages.
Office Communication for U.S. Appl. No. 16/004,182 dated Nov. 30, 2020, 55 Pages.
Office Communication for U.S. Appl. No. 14/859,114 dated Dec. 1, 2020, 24 Pages.
Office Communication for U.S. Appl. No. 16/883,922 dated Dec. 2, 2020, 9 Pages.
Office Communication for U.S. Appl. No. 16/883,879 dated Dec. 8, 2020, 5 Pages.
Office Communication for U.S. Appl. No. 16/152,277 dated Dec. 28, 2020, 5 Pages.
Office Communication for U.S. Appl. No. 16/004,182 dated Jan. 28, 2021, 4 Pages.
Office Communication for U.S. Appl. No. 14/595,598 dated Feb. 4, 2021, 19 Pages.
Office Communication for U.S. Appl. No. 17/115,529 dated Feb. 8, 2021, 15 Pages.
Office Communication for U.S. Appl. No. 16/262,756 dated Feb. 10, 2021, 19 Pages.
Office Communication for U.S. Appl. No. 17/114,384 dated Feb. 17, 2021, 12 Pages.
Office Action for European Patent Application No. 17206518.7 dated Feb. 23, 2021, 6 Pages.
Office Communication for U.S. Appl. No. 14/859,114 dated Mar. 8, 2021, 4 Pages.
Office Communication for U.S. Appl. No. 16/004,182 dated Mar. 8, 2021, 60 Pages.
Office Communication for U.S. Appl. No. 17/062,500 dated Mar. 9, 2021, 17 Pages.
Office Communication for U.S. Appl. No. 16/152,277 dated Mar. 18, 2021, 10 Pages.
Office Communication for U.S. Appl. No. 17/160,698 dated Mar. 18, 2021, 11 Pages.
Office Communication for U.S. Appl. No. 17/062,500 dated May 18, 2021, 4 Pages.
Office Communication for U.S. Appl. No. 17/203,371 dated May 20, 2021, 10 Pages.
Office Communication for U.S. Appl. No. 17/115,529 dated May 25, 2021, 18 Pages.
Office Communication for U.S. Appl. No. 14/859,114 dated May 26, 2021, 11 Pages.
Office Communication for U.S. Appl. No. 16/262,756 dated May 27, 2021, 7 Pages.
Office Communication for U.S. Appl. No. 17/114,384 dated May 27, 2021, 13 Pages.
Office Communication for U.S. Appl. No. 17/190,653 dated May 27, 2021, 11 Pages.
Office Communication for U.S. Appl. No. 16/741,567 dated Jun. 8, 2021, 5 Pages.
Office Communication for U.S. Appl. No. 17/203,452 dated Jun. 23, 2021, 11 Pages.

(56) References Cited

OTHER PUBLICATIONS

Office Communication for U.S. Appl. No. 16/152,277 dated Jun. 25, 2021, 10 Pages.
Office Communication for U.S. Appl. No. 16/004,182 dated Jul. 1, 2021, 58 Pages.
Office Communication for U.S. Appl. No. 17/160,698 dated Jul. 2, 2021, 12 Pages.
Office Communication for U.S. Appl. No. 17/062,500 dated Oct. 27, 2021, 17 Pages.
Office Communication for U.S. Appl. No. 14/595,598 dated Oct. 28, 2021, 6 Pages.
Office Communication for U.S. Appl. No. 16/741,567 dated Oct. 28, 2021, 11 Pages.
Office Communication for U.S. Appl. No. 17/203,452 dated Nov. 2, 2021, 13 Pages.
Office Communication for U.S. Appl. No. 17/190,653 dated Nov. 10, 2021, 6 Pages.
Office Communication for U.S. Appl. No. 17/484,167 dated Nov. 18, 2021, 15 Pages.
Office Communication for U.S. Appl. No. 17/504,289 dated Dec. 7, 2021, 15 Pages.
Office Communication for U.S. Appl. No. 17/114,384 dated Dec. 14, 2021, 7 Pages.
Office Communication for U.S. Appl. No. 16/226,587 dated Aug. 5, 2019, 46 Pages.
Office Communication for U.S. Appl. No. 16/228,716 dated Jun. 24, 2019, 10 Pages.
Office Communication for U.S. Appl. No. 16/231,354 dated Jul. 10, 2019, 8 Pages.
Office Communication for U.S. Appl. No. 16/262,756 dated Aug. 5, 2019, 35 Pages.
Office Communication for U.S. Appl. No. 15/967,499 dated Jun. 27, 2018, 16 Pages.
Office Communication for U.S. Appl. No. 16/226,587 dated Feb. 25, 2019, 43 Pages.
Office Communication for U.S. Appl. No. 16/228,716 dated Feb. 28, 2019, 15 Pages.
Office Communication for U.S. Appl. No. 16/231,354 dated Mar. 25, 2019, 10 Pages.
Office Communication for U.S. Appl. No. 16/262,756 dated Apr. 2, 2019, 29 Pages.
Office Communication for U.S. Appl. No. 16/262,790 dated Aug. 23, 2019, 16 Pages.
Office Communication for U.S. Appl. No. 16/262,790 dated Apr. 18, 2019, 14 Pages.
Office Communication for U.S. Appl. No. 16/262,756 dated Oct. 25, 2019, 4 Pages.
Office Communication for U.S. Appl. No. 16/659,488 dated Dec. 30, 2019, 6 Pages.
Office Communication for U.S. Appl. No. 14/595,598 dated Dec. 31, 2019, 16 Pages.
Office Communication for U.S. Appl. No. 16/004,208 dated Aug. 27, 2018, 11 Pages.
Office Communication for U.S. Appl. No. 16/234,395 dated Aug. 8, 2019, 10 Pages.
Office Communication for U.S. Appl. No. 16/234,334 dated Apr. 5, 2019, 15 Pages.
Office Communication for U.S. Appl. No. 16/234,395 dated Mar. 28, 2019, 10 Pages.
Kappes, Giorgos et al., "Dike: Virtualization-awarn Access Control for Multitenant Filesystems", Feb. 18, 2013, pp. 1-6.
Hitz, DAVE et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 dated Jun. 30, 2017, 23 Pages.
Extended European Search Report for European Patent Application No. 18155779.4 dated Apr. 17, 2018, 15 Pages.
Office Communication for U.S. Appl. No. 16/004,182 dated Aug. 23, 2018, 43 Pages.
Office Communication for U.S. Appl. No. 16/004,182 dated Mar. 5, 2019, 46 Pages.
Office Communication for U.S. Appl. No. 16/004,182 dated Jul. 3, 2019, 45 Pages.
Office Communication for U.S. Appl. No. 15/694,604 dated Jun. 3, 2019, 8 Pages.
Office Communication for U.S. Appl. No. 16/004,182 dated May 22, 2019, 4 Pages.
Office Communication for U.S. Appl. No. 14/595,043 dated May 4, 2017, 30 Pages.
Office Communication for U.S. Appl. No. 14/595,043 dated Feb. 23, 2018, 16 Pages.
Office Communication for U.S. Appl. No. 14/595,043 dated May 25, 2018, 7 Pages.
Office Communication for U.S. Appl. No. 14/595,043 dated Oct. 5, 2018, 17 Pages.
Office Communication for U.S. Appl. No. 14/595,043 dated Jun. 7, 2019, 19 Pages.
Office Communication for U.S. Appl. No. 14/595,043 dated Aug. 27, 2019, 17 Pages.
Office Communication for U.S. Appl. No. 14/658,015 dated Apr. 27, 2017, 7 Pages.
Office Communication for U.S. Appl. No. 14/658,015 dated Jan. 4, 2018, 28 Pages.
Office Communication for U.S. Appl. No. 14/658,015 dated Jul. 13, 2018, 8 Pages.
Office Communication for U.S. Appl. No. 14/859,061 dated Sep. 22, 2017, 16 Pages.
Office Communication for U.S. Appl. No. 15/831,236 dated Mar. 30, 2018, 8 Pages.
Office Communication for U.S. Appl. No. 15/831,236 dated Aug. 15, 2018, 14 Pages.
Office Communication for U.S. Appl. No. 14/859,114 dated Jul. 24, 2017, 41 Pages.
Office Communication for U.S. Appl. No. 14/859,114 dated Feb. 21, 2018, 25 Pages.
Office Communication for U.S. Appl. No. 14/859,114 dated May 11, 2018, 5 Pages.
Office Communication for European U.S. Appl. No. 17/864,190 dated Apr. 17, 2018, 4 Pages.
Office Communication for U.S. Appl. No. 17/115,529 dated Dec. 13, 2023, 4 Pages.
Office Communication for U.S. Appl. No. 17/115,529 dated Jan. 12, 2024, 26 Pages.
Office Communication for U.S. Appl. No. 18/503,791 dated Jan. 4, 2024, 27 Pages.

* cited by examiner

TIERED DATA STORAGE WITH EPHEMERAL AND PERSISTENT TIERS

TECHNICAL FIELD

The present invention relates generally to file systems, and more particularly, but not exclusively, to tiered data stores with ephemeral and durable layers.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth. Further, often contemporary distributed file systems may be implemented in various cloud computing environments. In some cases, cloud computing environments provided by different cloud computing providers may require specialized handling adapted to particular features or characteristics of a given cloud computing environment. Failure to adapt file system operations to particular cloud computing environment characteristics may result in disadvantageous cost or performance impacts. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
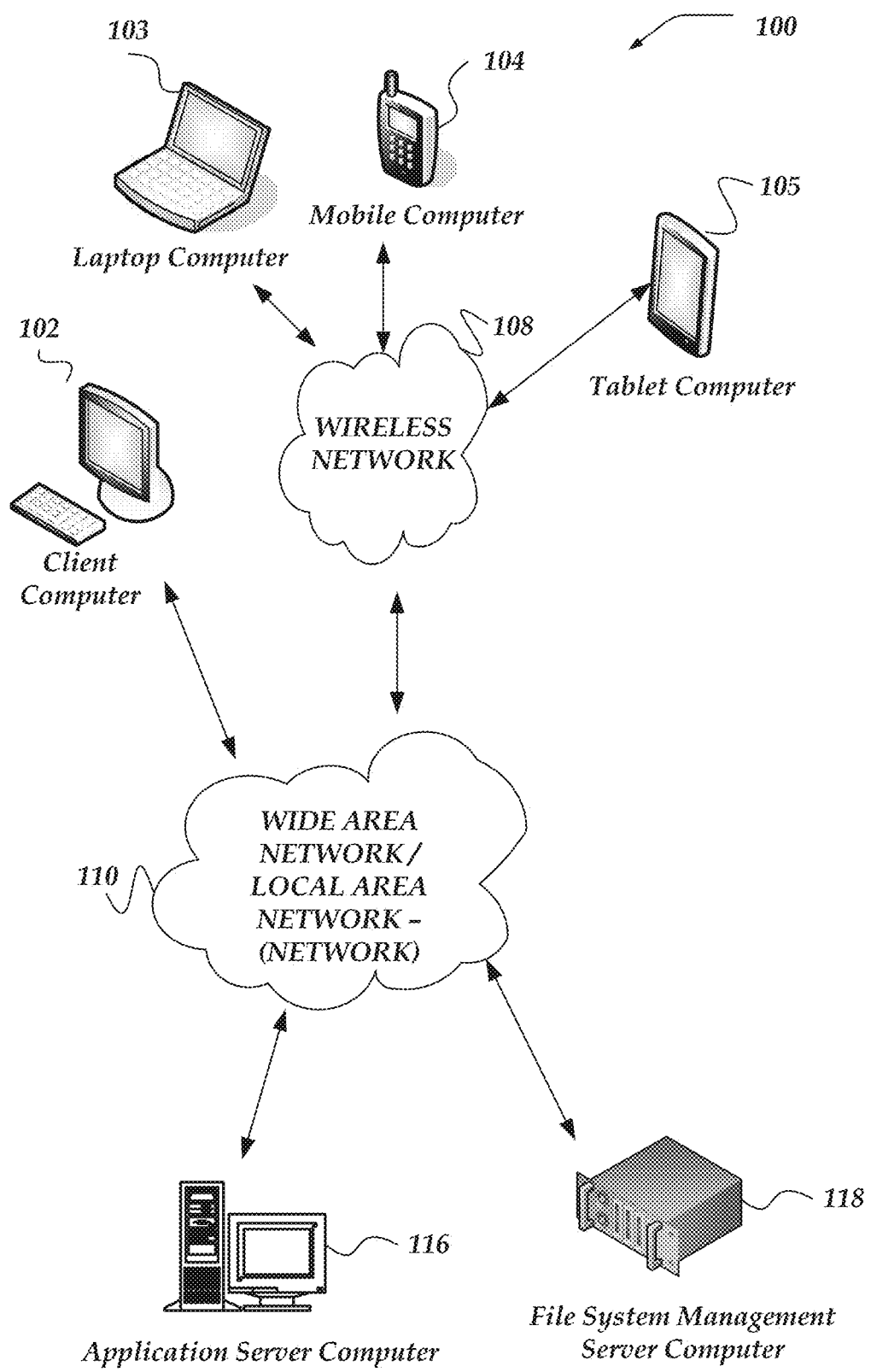
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VB Script, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system item" refers to entities stored in a file system. These may include files, directories, or the like. In this document for brevity and clarity all file system items stored in a file system may be referred to as file system items.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as files may be of various sizes, comprised of the number of blocks necessary to represent or contain the data or meta-data for the file system object.

As used herein the terms "write-ahead log,", or "WAL" refer to data structures for providing persistent records to support atomicity and durability in file systems, databases, or other data stores. Typically, a transaction may be considered "persisted" if the information or actions associated with the transaction are recorded in a corresponding WAL. In some cases, WALs may be configured to record meta-data associated with transactions rather than the storing the payload data in the WAL. In general, organization/operational policies may determine which transactions or which data is recorded in a given WAL.

As used herein the term "write-ahead log block" refers to data structures that represent a portion of a write-ahead log. Write-ahead log blocks may include meta-data that associates them with subsequent payload blocks that comprise the write-ahead log. Write-ahead log blocks may include meta-data for managing the write-ahead log or other file system accounting/administration. Also, write-ahead log blocks may include or reference a list of transactions or transaction blocks (described below).

As used herein the term "payload block" refers to data structures used for storing one or more data blocks associated with WAL blocks in a storage tier. Payload blocks may be considered to include one or more file system data blocks. The number of file system data blocks included in a payload block may vary depending on the underlying file system operation. Payload blocks may be indirectly or directly referenced by a corresponding WAL block or included in a corresponding WAL block. In some cases, a single payload block may include data for multiple requests that may be part of a larger file system-wide transaction.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to tiered data store with ephemeral and persistent layers. In one or more of the various embodiments, a write tier in the file system for storing data associated with one or more write requests from one or more file system clients may be determined based on location information associated with the one or more write requests such that the file system includes a read tier and the write tier.

In one or more of the various embodiments, a value for a performance metric that corresponds to the one or more write requests may be predicted based on one or more characteristics of the one or more write requests such that the performance metric may be determined based on a plurality of interactions with the write tier.

In one or more of the various embodiments, the predicted value that exceeds a threshold value of the performance metric may be employed to cause performance of further actions, including: queuing a portion of the one or more write requests in a memory buffer that is separate from the write tier based on the predicted value and the threshold value; combining the queued portion of the one or more write requests into one or more payload segments; storing the one or more payload segments in the write tier such that a measured value of the performance metric may be less than the threshold value and such that the measured valued may be associated with storing the one or more payload segments in the write tier; or the like.

In one or more of the various embodiments, combining the portion of the one or more write requests may include: generating one or more write ahead log (WAL) blocks and one or more transaction blocks based on the queued portion of the one or more write requests such that the data associated with the queued portion of the write requests may be included in the one or more transaction blocks and such that meta-data associated with the one or more transaction blocks may be included in the one or more WAL blocks; including the one or more WAL blocks and the one or more transaction blocks in the one or more payload segments; or the like.

In one or more of the various embodiments, storing the one or more payload segments may include: storing one or more transaction blocks included in the one or more payload segments in a payload segment of the write tier; storing one or more Write Ahead Log (WAL) blocks included in the one or more payload segments in a WAL segment of the write tier; or the like.

In one or more of the various embodiments, predicting the value for the performance metric may include: predicting an input-output-operations-per-second (IOPS) value associated with the interactions with the write tier based on one or more characteristics of the one or more write requests.

In one or more of the various embodiments, a read tier in the file system that may be storing a portion of the data associated with the one or more write requests may be determined. In some embodiments, the portion of the data in the read tier may be invalidated.

In one or more of the various embodiments, an amount of available storage space in the write tier may be monitored. In some embodiments, in response to the amount of available storage space being less than threshold value further action may be performed, including: combining one or more other payload segments stored in the write tier into one or more objects; storing the one or more objects in an object tier such that the amount of available storage space in the write tier is increased based on a size of the one or more objects; or the like.

In one or more of the various embodiments, a cloud-based block storage service may be employed to provide storage capacity to store data for the write tier.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features.

Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include the capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers.

Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
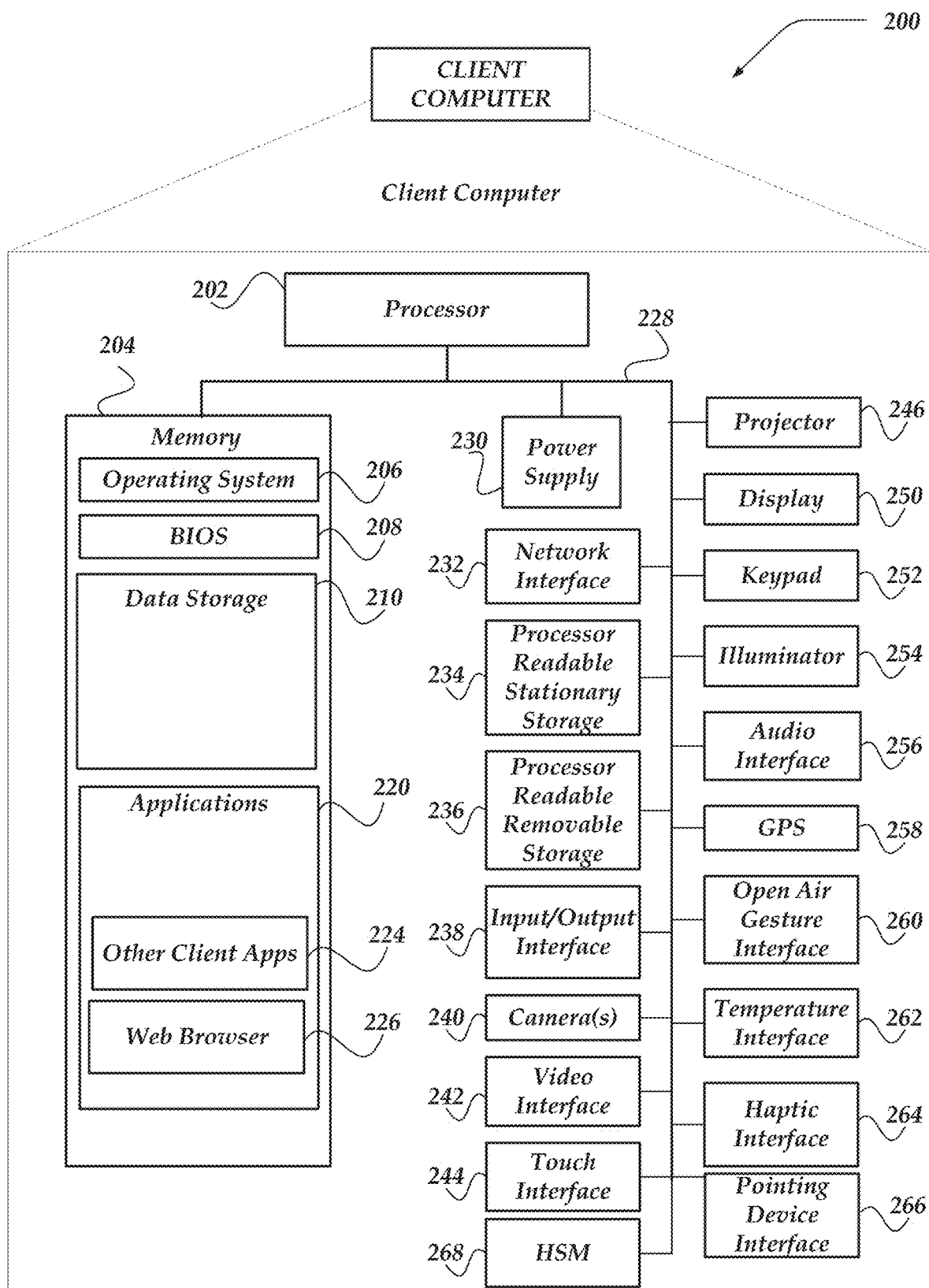
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic 16 to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
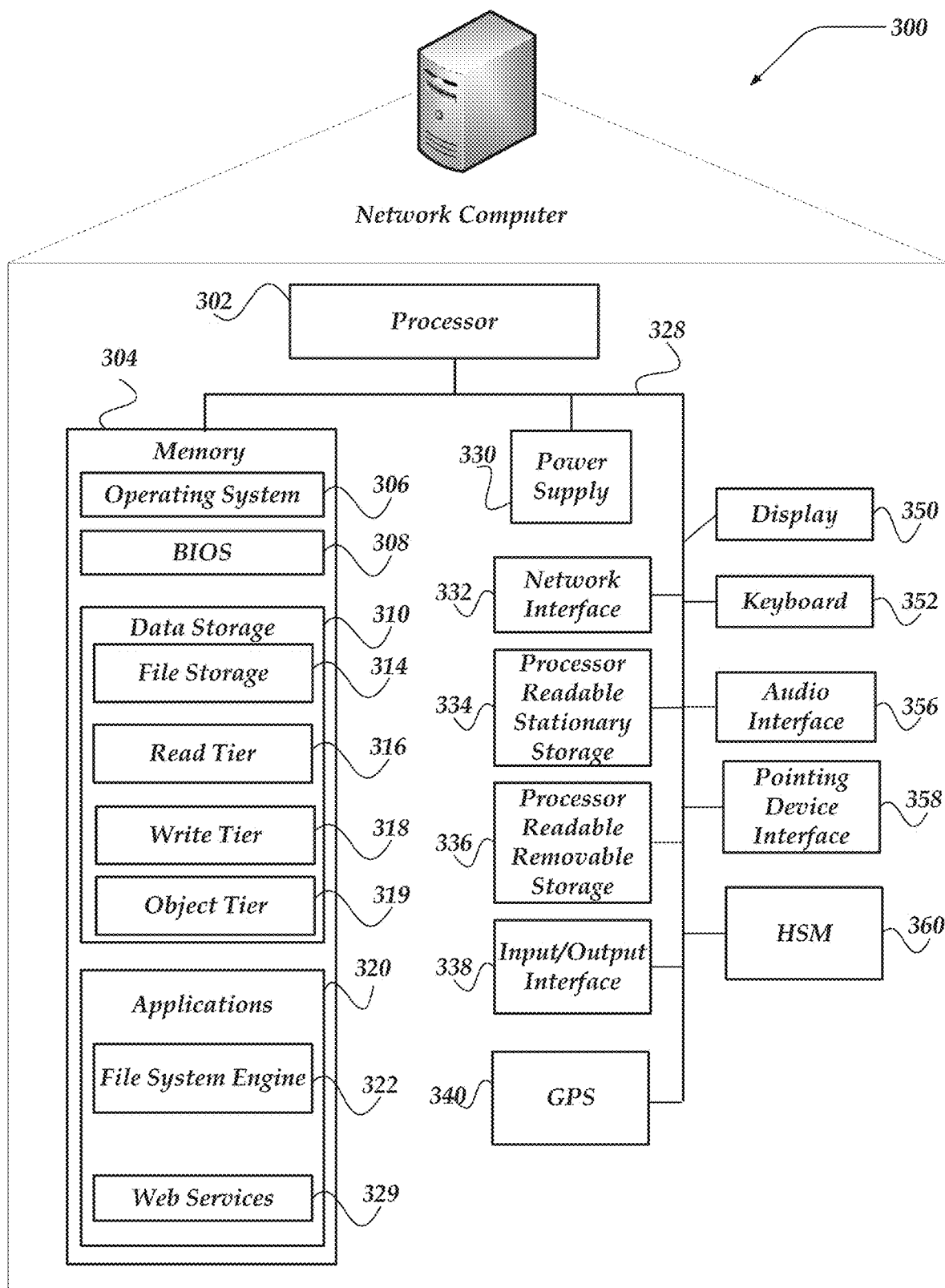
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™ WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, read tier 316, write tier 318, object tier 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment.

Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
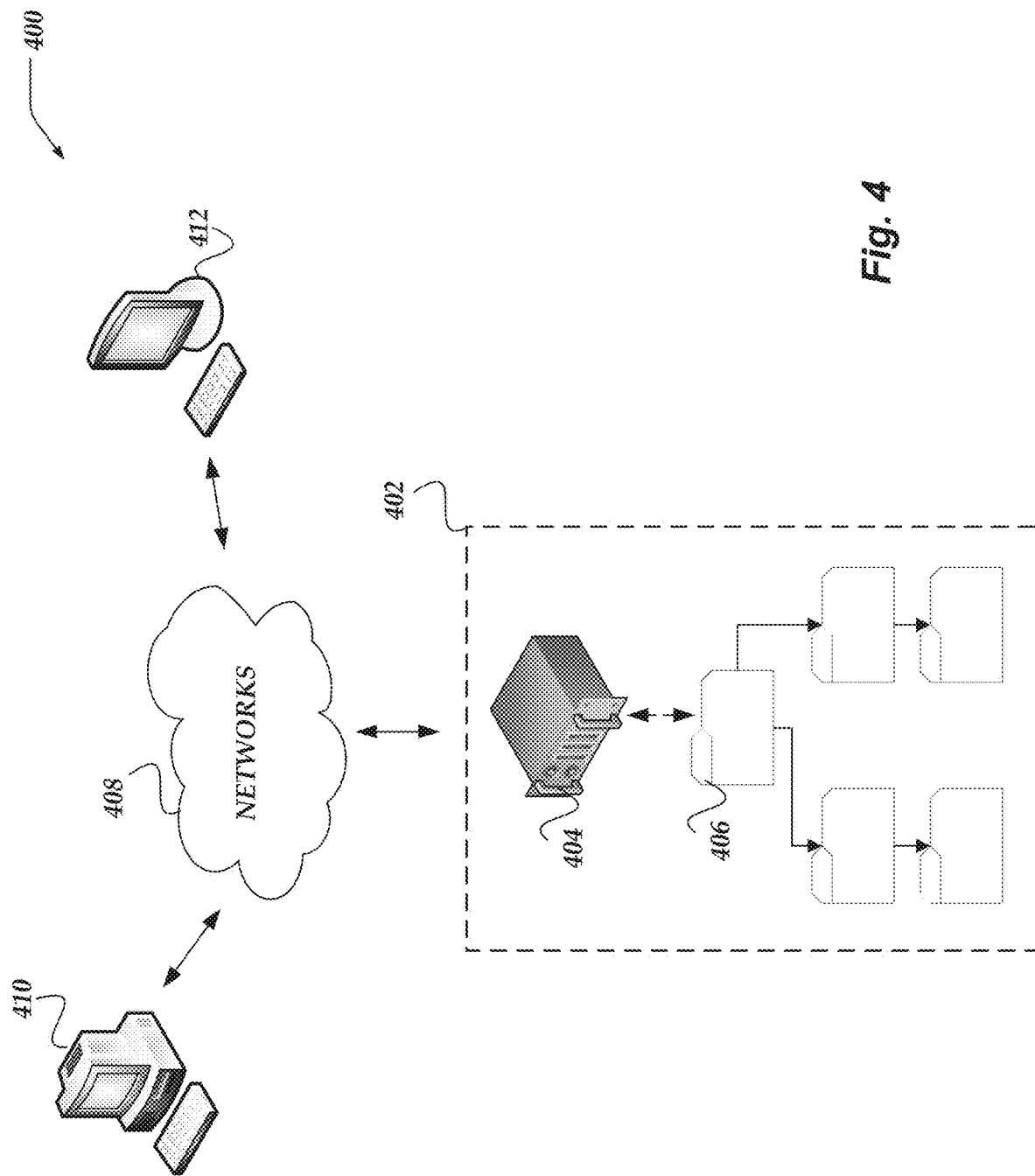
FIG. 4 illustrates a logical architecture of a system for tiered data store with ephemeral and persistent layers in accordance with one or more of the various embodiments.

FIG. 4 illustrates a logical architecture of system 400 for tiered data store with ephemeral and persistent layers in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system items, documents, or the like) that may be stored in file system 402.

In some embodiments, file system 402 may comprise one or more file system management computers, such as file system management computer 404. Also, in one or more of the various embodiments, file systems, such as file system 402 may include one or more file system items, such as file system item 406. In one or more of the various embodiments, file system item 406 may be considered to represent the various file system items, documents objects, or the like, that may be stored in file system 402. In some embodiments, file system items may include, files, documents, directories, folders, backups, snapshots, replication snapshots, replication information, or the like. In some embodiments, some file system items may be comprised of smaller file system items. Accordingly, in some embodiments, blocks or data blocks may be considered to be smallest file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports tiered data store with ephemeral and persistent layers because file system engines may be arranged to mimic the interface or behavior of one or more conventional file systems.

Also, while file system 402 is illustrated as using one file system management computer with one set of file system items, these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, storage clusters, or the like.

Figure 5:
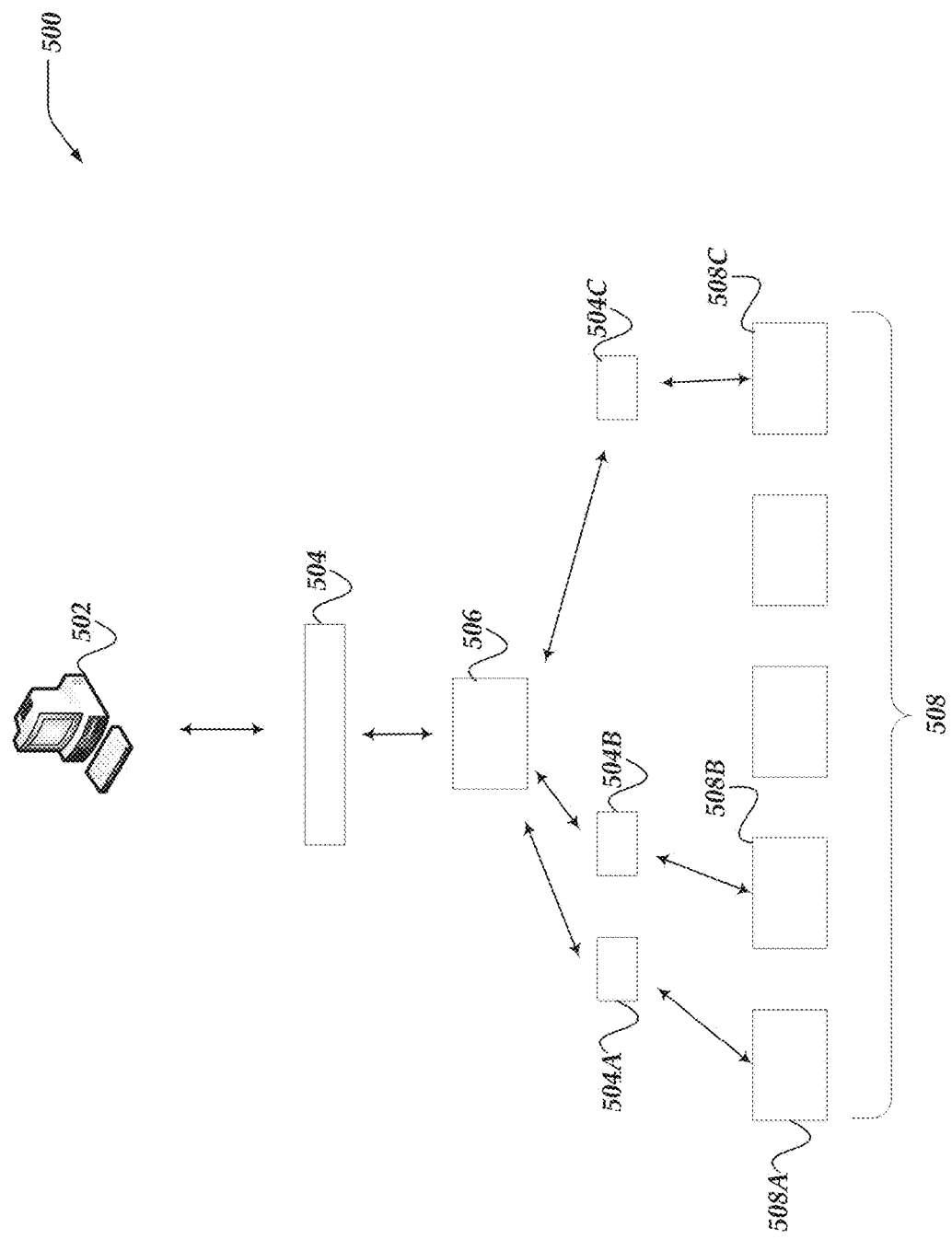
FIG. 5 illustrates a logical schematic of a file system for tiered data storage with ephemeral and persistent layers in accordance with one or more of the various embodiments.

FIG. 5 illustrates a logical schematic of file system 500 for tiered data store with ephemeral and persistent layers in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according one or more data protection schemes, striping schemes, RAID configurations, or the like, that may provide a desired level of data protection, performance, high-availability, or the like, that may vary depending on the given file system.

In some embodiments, file system clients may be enabled to issue various file system commands (e.g., read file, remove file, save file, or the like) to file system engines that may initiate one or more command transactions. Accordingly, in some embodiments, file system engines may be arranged to determine which portion of the command transaction may be satisfied by various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g., files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request completes successfully, the read transaction may be considered successful and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
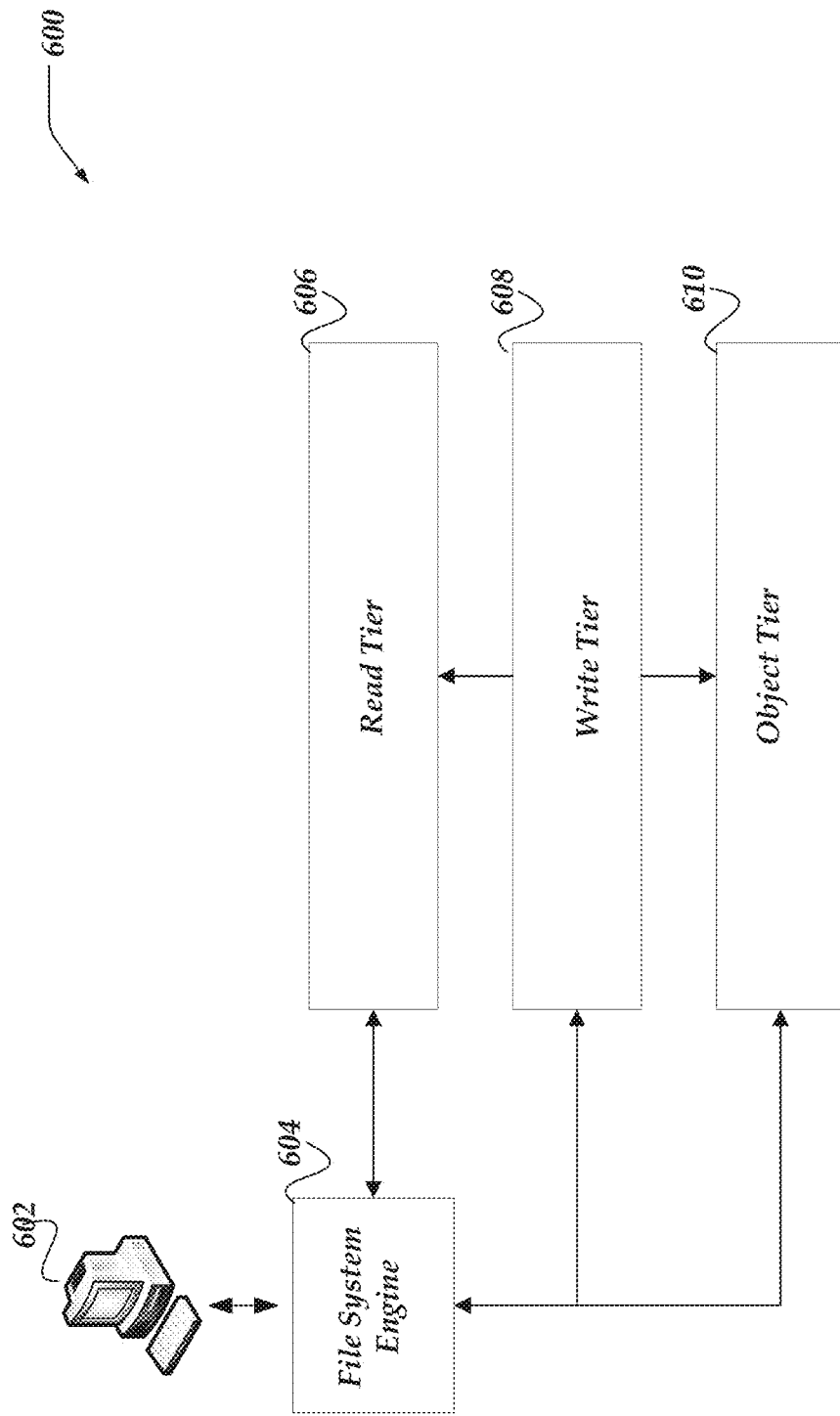
FIG. 6 illustrates a logical schematic of a file system for tiered data storage with ephemeral and persistent layers in accordance with one or more of the various embodiments.

FIG. 6 illustrates a logical schematic of file system 600 for tiered data storage with ephemeral and persistent layers in accordance with one or more of the various embodiments. In some embodiments, file systems may be implemented in one or more cloud computing environments. Often, data storage services provided by cloud computing providers may mimic some or all features of conventional disk drives. For example, most cloud computing providers provide features or services, such as block storage services (e.g., block storage) that may be based on or otherwise emulate conventional hard drives, solid state drivers, or the like.

However, in some embodiments, pricing models, performance considerations, resource/bandwidth limits/quotas, or the like, associated with cloud-based data storage services provided by cloud computing providers may be disadvantageous for naive use of such services. In some cases, latency, access limitations (e.g., IOPS quotas), capacity restrictions, capacity costs, or the like, of native cloud computing storage services may result in unpredictable performance variations, cost increases/fluctuations, reliability concerns, or the like. Accordingly, in some embodiments, file systems may be arranged to compensate for some of the disadvantages of native cloud-based storage as described herein.

In some embodiments, file systems, such as, file system 600 may be arranged to provide storage services by organizing stored data (and meta-data) by providing multiple storage tiers.

In some embodiments, file systems may be arranged to organize data into read tiers, write tiers, or object tiers. In some embodiments, read tiers, such as read tier 606 may be arranged to provide low latency read-only operations for data cached in the read tier. In some embodiments, write tiers, such as write tier 608 may provide persistent stable storage with some performance limitations or cost considerations. And, in some embodiments, object tiers, such as object tier 610 may be arranged to lower cost long-term storage at the cost of latency or data format mismatch, such as providing object based storage rather than block storage. In this context, data format mismatches may be considered to include the semantic or API mismatches between conventional file system operations and object based operations.

In some embodiments, read tiers, such as read tier 606 may be considered to provide ephemeral storage that may be assumed to become unavailable more or less at the whim of the cloud computing environment. Generally, cloud computing environments may enable ephemeral storage to be associated with compute instances. In some cases, ephemeral storage may enable performant read/write services for the associated compute instances. However, in some cloud computing environments, if compute instances may be moved (within the cloud computing environment) or reset/re-provisioned, ephemeral storage may be discarded. Accordingly, ephemeral storage may be considered unreliable or non-persistent storage. Thus, in some embodiments, reliable file systems may employ ephemeral storage for temporary or otherwise unreliable caching.

In some embodiments, write tiers, such as, write tier 608 may be considered to be block storage devices that provide persistent storage for compute instances. In some cases, block storage may provide a reserved storage capacity that may generally operate similarly to hard disks. In some cases, cloud computing providers may rate limit the number of input/output operations (IOPS) associated with accessing block storage. In some cases, the rate limiting may be independent of the general purpose bandwidth or data transfer services provided within the cloud computing environment. Also, in some cases, cloud computing providers may charge different prices for general purpose bandwidth or data transfer versus the cost for accessing block storage. Accordingly, in some embodiments, file systems may be arranged to intentionally manage the I/O operations directed to block storage devices to reduce or manage costs.

In some embodiments, cloud computing environments may provide object storage services referred to herein as object stores. In some cases, object stores may be the lowest cost data storage offered by cloud computing providers. However, in some cases, object stores may behave or operate much differently than hard disks or their cloud-based analogs (e.g., block storage). For example, object stores may store data in non-ordered/non-indexed buckets of arbitrarily sized objects while block storage may store data in indexed/ordered blocks of a fixed size. Accordingly, for example, in some cases, a file that consumes 1000 blocks of block storage may be stored in a single object in an object store. Also, while block storage may provide interfaces that easily enable random data access, object stores may typically provide access to entire objects. Further, for example, in some cases, objects in object stores may be immutable such that updating a portion of the data in an object requires the entire object to be replaced rather than just replacing the modified portions of the affected objects. Also further, for example, object stores may employ indexing/naming semantics that may be very different from indexing/naming semantics used by block storage of file storage. For example, data in block storage may be accessed using addresses, address ranges, offsets, or the like, while objects typically may be accessed using object names or object identifiers rather than addresses.

Accordingly, in some embodiments, file systems, such as file system 600 may be arranged to leverage or balance the different types of storage facilities offered by cloud computing environments to provide performant, reliable, and consistent storage.

In this example, for some embodiments, client 602 may be considered to be a file system client that may be reading or writing file system item (e.g., documents) in the file system. In some embodiments, file system engines, such as file system engine 604 may be arranged to provide interfaces that enable client 602 to conventionally access the file system absent visibility to the underlying tiered architecture. Accordingly, in some embodiments, file system engines may be arranged to employ read tiers, write tiers, or object tiers in concert to provide performant, reliable, and consistent storage service to one or more clients.

Further, in some embodiments, file system engines may be arranged to manage the interactions or relationships between or among the various tiers of the file system. For example, in some embodiments, file system engines may be arranged to populate or evict data to or from particular tiers as per one or more file system policies. For example, a file system policy may be employed to determine if data should be kept in the read tier or evicted from the read tier. Likewise, in some embodiments, file system engines may be arranged to enforce policies associated with pushing data from the write tier to the object tier or vice-versa.

Also, in some embodiments, as described above (See, FIG. 5), file system engines may be provided file system commands may initiate a file system wide transaction, referred to generically as command transactions, or more precisely as read transactions for read commands or write transactions for write commands. As mentioned above, in some embodiments, file system engines may be arranged to generate one or more file system requests that each service a one or more portions of the data or actions associated with a command transaction. In some embodiments, one or more file system requests from a command transaction may be directed to different nodes (or protection stores) that may comprise a distributed file system. Furthermore, in some embodiments, one or more file system requests provided to a node or protection store may be associated with the same command transaction.

In some embodiments, file system engines may be arranged to allocate different requests associated with the same command transaction to different tiers in the file system depending on one or more file system policies. Likewise, in some embodiments, file system engines may be arranged to allocate one or more requests that are associated with the same command transaction to different tiers on different nodes. For example, in some embodiments, a first portion of requests from a transaction may be allocated to the write tier on one node while another portion of requests from the same transaction may be allocated to the object tier for a different node.

For example, in one or more of the various embodiments, if a file system client issues a write command to save a large file, a file system policy may determine that the data blocks corresponding to the large file may be stored directly into the object tier. In another example, in some embodiments, if a file system is periodically/continuously appending data to a file, a file system policy may determine that data blocks that include file meta-data (e.g., file size, last access time, or the like) may be stored in the write tier while the bulk of the data for the file may be stored directly into the object tier. Thus, in this example, updating the meta-data for the file as data is appended to the file may take advantage of the lower latency and short term overwrite deduplication provided by the write tier for updating the meta-data while the bulk of the file may be stored directly in the object tier—by passing the write tier altogether.

Further, in some embodiments, file system policies may be configured to determine that files or other file system items with particular characteristics (e.g., small files, repeatedly accessed files or portions of files, short-lived files, small parts of large files, or the like) may be preferably stored in write tiers over object tiers. In some embodiments, such allocation decisions may be determined independently for each node. For example, in some embodiments, if the write tier of a first node is full or otherwise unavailable, data that may otherwise be stored in its write tier may be directed to its object tier, while other nodes in the file system store the data in the write tier.

Similarly, in some embodiments, read requests associated with a read transaction may be distributed across nodes or tiers in the file system depending on where the requested data may be located. For example, in some embodiments, some data for read requests may be found in a read tier while other portions of the requested data may be found in a write tier or an object tier.

Also, in one or more of the various embodiments, file system engines may be arranged to monitor request patterns to determine if data should be stored in write tiers or object tiers. Likewise, in some embodiments, file system engines may be arranged to determine if data in one tier should be moved to another tier. For example, in some embodiments, one or more read-cache algorithms may be applied to determine if data blocks should be promoted from a write tier or an object tier to a read tier or evicted from the read tier. Likewise, in some embodiments, for example, one or more consolidation algorithms may be applied to determine if data in write tiers should be consolidated into data objects and moved into object tiers.

Figure 7:
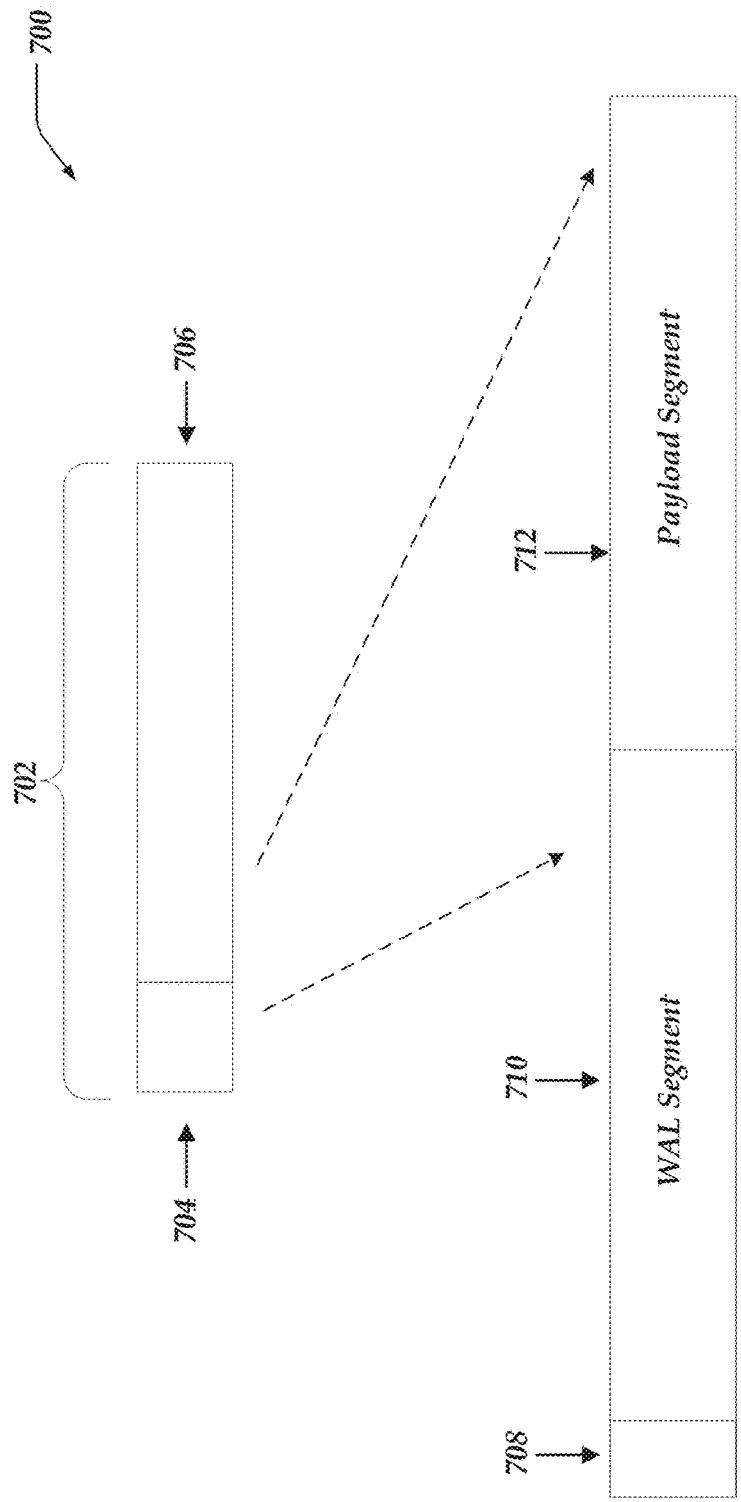
FIG. 7 illustrates a logical schematic of a data structure for a write tier for tiered data store with ephemeral and persistent layers in accordance with one or more of the various embodiments.

FIG. 7 illustrates a logical schematic of data structure 700 for a write tier for tiered data store with ephemeral and persistent layers in accordance with one or more of the various embodiments. As described above, file systems may be arranged to include read tiers, write tiers, and object tiers. Accordingly, in some embodiments, data included in a write tier may be organized based on data structure 700.

In one or more of the various embodiments, file systems may be arranged to store data for write tiers in persistent (non-ephemeral) block devices provided by cloud computing providers for a given cloud computing environment. For example, in some embodiments, a singleton disk object may be provisioned on permanent SSDs for a write-tier store with a contiguously allocated disk address range.

In some embodiments, write tiers may be arranged to store data/meta-data of WAL entries, such as WAL entry 702. In some embodiments, WAL entries may include WAL meta-data, such as WAL meta-data 704. Also, in some embodiments, if the WAL entry may correspond to write requests, WAL entries may include a payload block, such as payload block 706 that includes the file system data blocks associated with the write requests. Also, in some embodiments, if the WAL entry is associated with a write request that does not include file system blocks, such as deletes, the WAL payload block may be absent because the WAL meta-data block may include the information about which file system data blocks a client may be requesting to delete.

In one or more of the various embodiments, data in a write tier may be organized into various data segments, such as: superblock 708 for storing information about the write tier or other file system meta-data; WAL segment 710 for storing WAL meta-data that may include information about the payload or activity corresponding the WAL entry; and payload segment 712 for storing the payload blocks that correspond to write requests that may be part of a larger file system-wide transaction associated with one or more of the WAL meta-data blocks in WAL segment 710. In some embodiments, write tiers may be comprised of more data segments than shown here. For example, in some embodiments, a write tier may include more than one WAL segment, more than one payload segment, or more than one other data segment for storing information or data associated with one or more write requests. Accordingly, in some embodiments, various file system policies may be applied to determine which data segment should be used to store which kind of data. For example, in some embodiments, different data segments may be associated with different priority, costs, or the like.

In some embodiments, WAL segment 710 may be a circular buffer such that incoming WAL meta-data blocks of incoming WAL entries may be appended to the end of the circular buffer. Likewise, in some embodiments, payload segment 706 may be a circular buffer such that they may include payload blocks that store data corresponding to some or all WAL entries. For example, in some embodiments, if a write request may be selected for persisting in the write tier, one or more WAL meta-data blocks that correspond to those operations may be appended to the WAL segment and a payload block that contains file system data blocks corresponding to the WAL entry (if any) may be appended to the payload segment. In some embodiments, write tier data (e.g., WAL segments or payload segments) may be organized using other buffer data structures. Accordingly, in some embodiments, file system engines may be arranged to employ libraries, instructions, rules, or the like, provided via configuration information to determine the implementation details (e.g., fields, data layout, data format, or the like) for WAL segments or payload segments.

In some embodiments, WAL segments may be arranged to include WAL meta-data blocks that include meta-data about the changes to data at various addresses in the file system with pointers or references to actual data as needed. For example, in some embodiments, WAL meta-data blocks may include a list of transactions, changed data addresses (e.g., writes, deletes, or the like), or the like. Also, for example, WAL meta-data blocks may include references to file system data blocks stored in the payload blocks stored in payload segments or in some cases object tiers. Also, for example, WAL meta-data blocks may include sequence numbers, timestamps, or the like, for ordering WAL entries or otherwise organizing them.

Note, in some embodiments, file system engines may apply various policies for determining if payload blocks associated with WAL entries may be stored in the write tier payload segment. In some cases, file system engines may bypass the write tier to store one or more payload blocks in the object tier. Similarly, in some embodiments, file system engines may be arranged to monitor one or more file system capacity metrics or file system performance metrics to determine if WAL meta-data blocks or payload blocks may be removed from the write tier. For example, in some cases, file system policy may be configured to trigger write tier management operations based on observing how clients interact with file system items.

Figure 8:
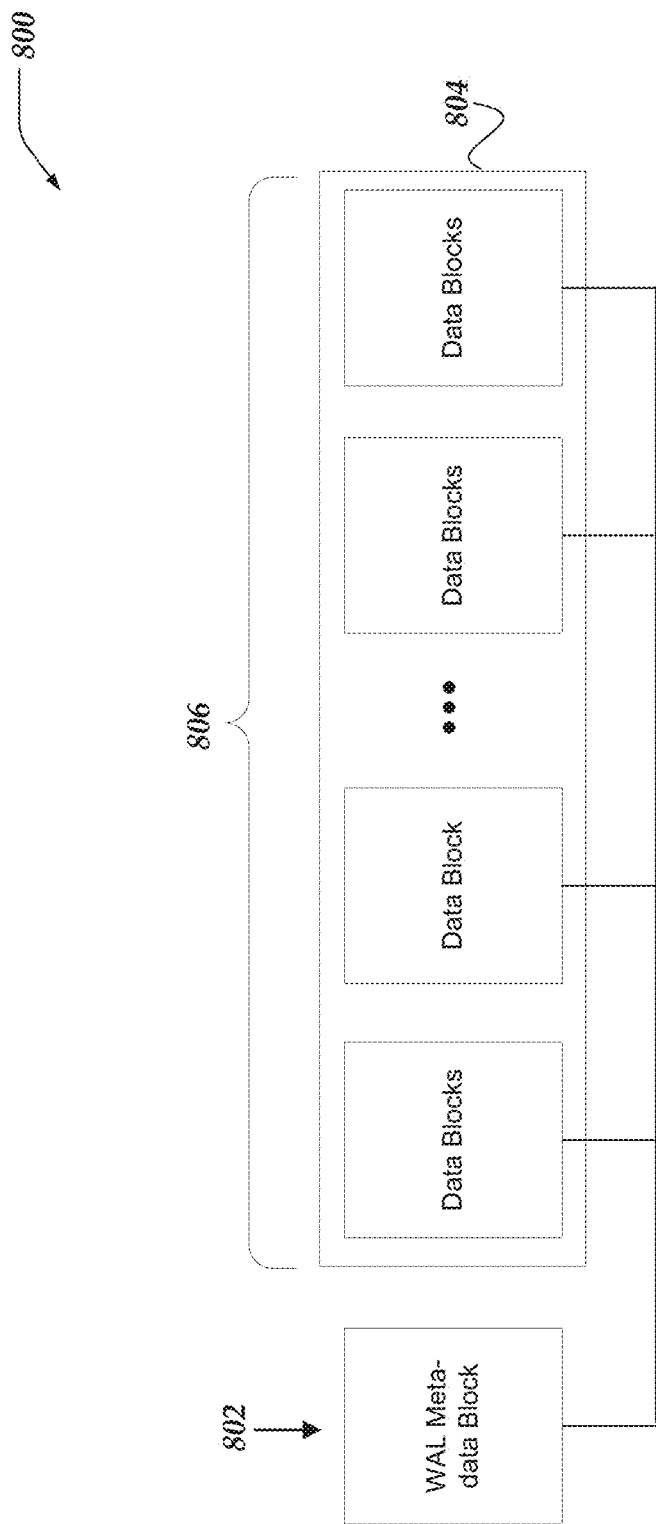
FIG. 8 illustrates a logical schematic of write information for tiered data stores with ephemeral and persistent layers in accordance with one or more of the various embodiments.

FIG. 8 illustrates a logical schematic of write information 800 for tiered data stores with ephemeral and persistent layers in accordance with one or more of the various embodiments. As described above, in some embodiments, file system writes may comprise one or more WAL entries which may include a WAL meta-data block and a payload block that includes one or more file system data blocks. In some embodiments, WAL meta-data blocks may be on-disk (e.g., persistent) data structures that contain information about the corresponding write operation and the transactions associated with the write operation.

In some embodiments, WAL meta-data blocks may include information or metrics that file system engines may employ to execute some file system operations. Accordingly, in some embodiments, WAL meta-data block data structures may be arranged to include one or more fields, such as, WAL identifiers, sequence numbers, total size, total file system block count, file system data block span, file system data block count, or the like. Also, in some embodiments, WAL meta-data blocks may include a list that references one or more file system data blocks included in the payload block.

In this example, for some embodiments, WAL meta-data block 802 represents single WAL meta-data block. Also, in this example, for some embodiments, payload block 804 represents a payload block that includes file system data blocks 806.

In one or more of the various embodiments, WAL meta-data blocks may include fields that may be used for confirming if all of its associated file system data blocks have been persisted locally in the file system. Accordingly, in some embodiments, upon restart or recovery, file system engines may be arranged to determine if the payload blocks associated with a WAL meta-data block have been locally persisted. For example, if the file system is interrupted before persisting all of the payload blocks (or file system data blocks) associated with a WAL meta-data block, the WAL meta-data block and its associated payload block may be rolled back since the write was interrupted before all of the file system data blocks in the payload block were persisted. For example, in some embodiments, upon startup, file system engines may be arranged to compare the information in the WAL meta-data block (e.g., transaction count, file system data block counts, or the like) with the number of persisted file system data blocks included in payload blocks. Accordingly, in this example, if there is a mismatch, the WAL meta-data block and the partially persisted payload block (if any) may be discarded or otherwise rolled back.

In some embodiments, file system engines may be arranged to store WAL meta-data blocks in the WAL segment of the write tier and the payload blocks in the payload segment of the write tier. (See, FIG. 7.)

Figure 9:
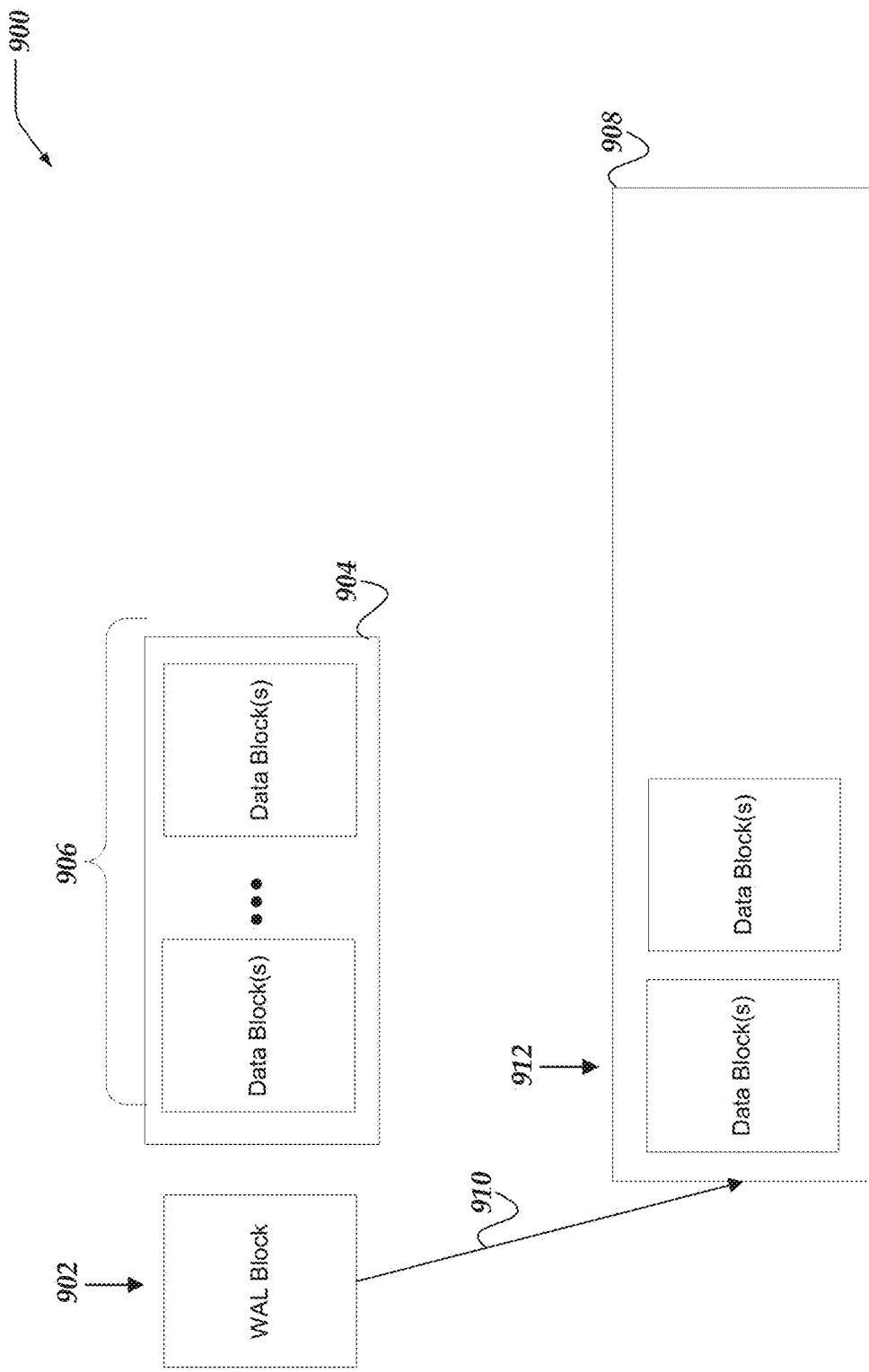
FIG. 9 illustrates a logical schematic of write information for tiered data store with ephemeral and persistent layers in accordance with one or more of the various embodiments.

FIG. 9 illustrates a logical schematic of write information 900 for tiered data store with ephemeral and persistent layers in accordance with one or more of the various embodiments. As mentioned above, the storage space for write tiers may be divided in WAL segments for storing WAL meta-data blocks and payload segments for storing payload blocks.

In some embodiments, file system engines may determine that some or all file system data blocks associated with a WAL meta-data block may be written directly to an object tier rather being persisted to the write tier. For example, in some embodiments, file system engines may be arranged to infer types of write activity based on observing the characteristics of the overall write operation. For example, if the client is moving or duplicating a very large file, the file system engine may determine that some or all transaction blocks may bypass the write tier and be written directly to the object tier. Also, for example, in some embodiments, a file system engine may be enabled to determine that a client may be appending data to a large file. Accordingly, the file system engine may be configured to store the transaction blocks that include meta-data for the file (e.g., file size, last updated, or the like) in the write tier while storing other transaction blocks in the object tier. In this example, it may be assumed the file system uses a file system item format that stores the file system meta-data for a file system items in particular offset locations with the file system item. For example, in some embodiments, a file system item format may require that the file system meta-data for file system items must be stored in the first data block. Thus, in this example, a file system engine may keep the file system data block associated with the first data block of the file system item in the write tier and bypass the write tier for one or more subsequent file system data blocks to enable low-latency meta-data updates as data is being added to file.

Accordingly, in some embodiments, WAL meta-data blocks, such as WAL meta-data block 902 may be arranged to reference a payload block, such as payload block 904 that may include one or more file system data blocks, such as file system data blocks 906 that may be stored in the write tier. However, in some embodiments, one or more of the file system data blocks associated with WAL meta-data block 902 may be located in the object tier. In this example, file system data blocks 906 may be considered to be a file system data blocks that may be stored in the object tier rather than in the write tier. In this example, WAL meta-data blocks may be considered to include a reference (e.g., reference 910) that points to an object, such as, object 908 in the object tier. Accordingly, in some embodiments, file system engines may be arranged to determine if data in the write tier may be superseded or otherwise invalidated because of data in the object tier.

In this example, for some embodiments, if a user tried to read data in the address range covered by data associated with WAL meta-data block 902, the file system engine may be arranged to determine if there may be data in the object tier that supersedes or otherwise invalidates the data in payload block 904. In this example, reference 910 indicates that the WAL meta-data block has a reference to object 908. Accordingly, in some embodiments, the file system engine may use the data in file system data block 912 from object 908 rather than data in payload block 904.

Also, as mentioned, in some embodiments, WAL segments or payload segments may be a fixed or limited size. Accordingly, in some embodiments, file system engines may be arranged to execute various file system policies (e.g., caching policies) for determining if WAL meta-data blocks or payload blocks may be evicted from the write tier to make room in the write tier for other write operations.

Figure 10:
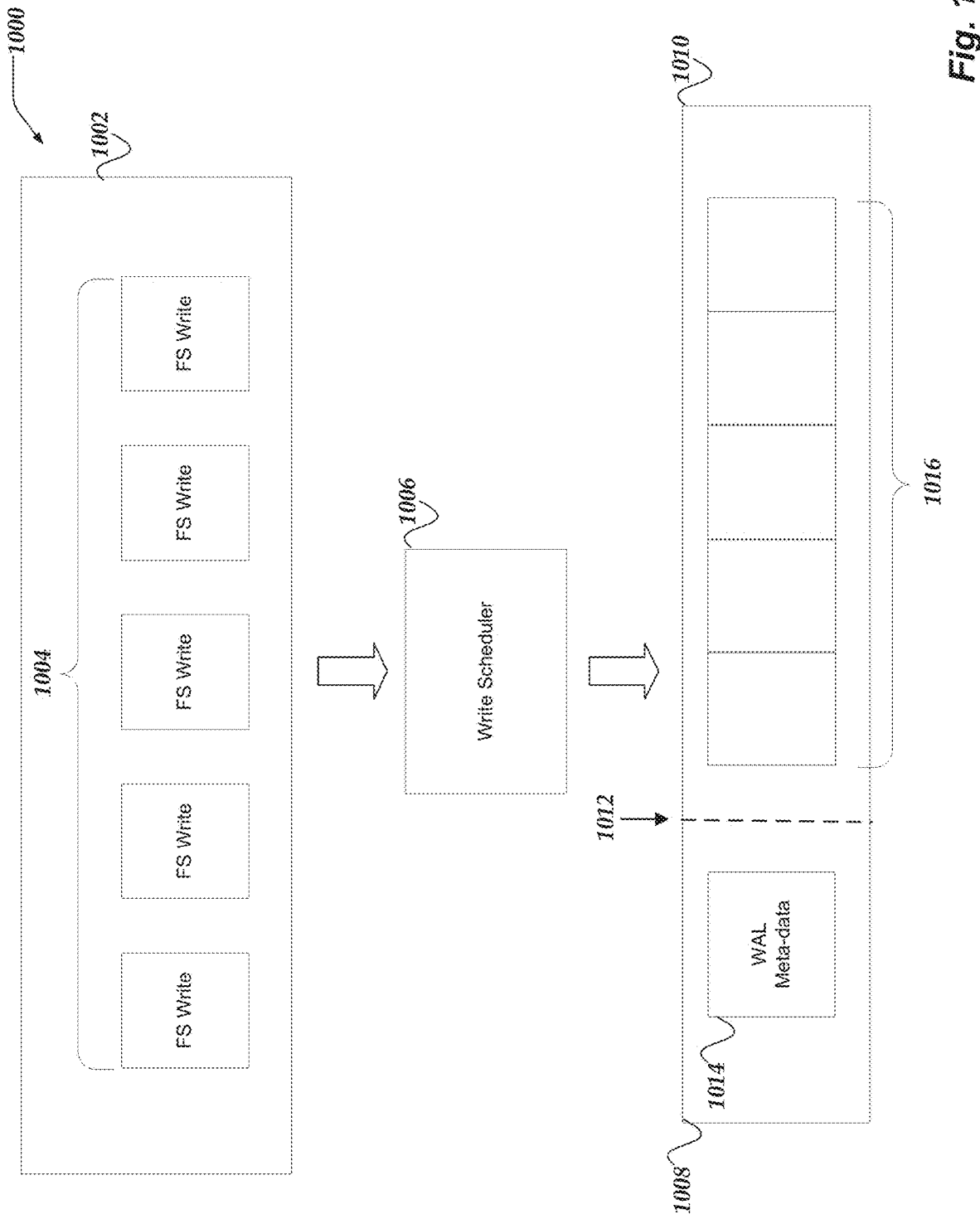
FIG. 10 illustrates a logical schematic of a file system for tiered data stores with ephemeral and persistent layers in accordance with one or more of the various embodiments.

FIG. 10 illustrates a logical schematic of file system 1000 for tiered data stores with ephemeral and persistent layers in accordance with one or more of the various embodiments.

For some embodiments, cloud computing environments may limit or restrict the rate of input-output operations (e.g., IOPS) associated with provisioned block storage. Often, IOPS for block storage may be measured and billed for each device. Accordingly, in some embodiments, file system engines may be arranged to organize write tier operations to minimize or otherwise intentionally manage the IOPS associated with write tiers.

Accordingly, in some embodiments, file system engines may be arranged to collect multiple write requests in a memory buffer. Thus, in some embodiments, multiple write requests may be coalesced into two writes to the write tier—one write to store the payload blocks in the payload segment and one write to store a WAL meta-data block in the WAL segment of the write tier.

In some embodiments, file system engines may be arranged to vary the amount of data kept in memory (RAM) depending on the amount of client activity. For example, if the IOPS for the write tier is capped at 3000 IOPS and the rate of client activity in the file system is 1500 IOPS or less, transactions may be passed to the write tier at the same rate they arrive. In contrast, continuing with this example, if the rate of client transactions exceeds 3000 IOPS, file system engines may be arranged to collect write requests in memory and coalesce them into fewer writes to the write tier. For example, if clients are generating 15000 IOPS, the write buffer may be used to collect at least 10 write requests (which may be associated with different file system-wide transactions) into a WAL entry with one WAL meta-data block and one payload block to reduce IOPS to the write tier to 3000. Accordingly, in some embodiments, file system engines may be arranged to provide more IOPS to file system clients than allowed for the write tier. Note, in some cases, cloud computing providers may determine the allowed IOPS for block storage devices based on various pricing models. For example, a cloud computing provider may be configured to charge an increased price per I/O operations if the IOPS threshold is exceeded. Thus, if block storage device IOPS is exceeded the organization (or file system provider) may be charged a higher price.

In some embodiments, if write tier IOPS are kept at or below the block storage IOPS limits, the file system operator (or its clients) may avoid higher costs associated with exceeding the block storage IOPS limit.

Accordingly, in some embodiments, file systems, such as file system 1000 may include a memory buffer, such as memory buffer 1002. In some embodiments, memory buffer 1002 may store one or more file write requests that may be associated with the same or different file system-wide transactions, such as, write requests 1004. In this example, write requests 1004 represents a number of file system write requests that are being buffered in memory buffer 1004.

In some embodiments, file system engines may be arranged to include one or more write schedulers, such as write scheduler 1006 for determining if write request held in the memory buffer should be moved to the persistent write tier.

In some embodiments, if write scheduler 1006 determines that write requests 1004 may be coalesced and moved to the block storage of the write tier, the write scheduler may generate payload block 1016 that includes some or all of file system data blocks for write requests 1004 from the memory buffer and a corresponding WAL meta-data block, such as WAL meta-data block 1014. In some embodiments, the write scheduler may execute an IOP to payload block 1016 to payload segment 1010 of the write tier and another IOP to write WAL meta-data block 1014 to WAL segment 1008 of the write tier. In some embodiments, file system engines may arrange the data associated write requests 1004 into contiguous data structures to enable the data for multiple write requests to be written to the write tier in one I/O operation. Accordingly, in some embodiments, the WAL meta-data block may include a list of references, offsets, or ranges to enable file system engines to associate the data in the payload segment with the particular write requests or file system-wide transactions.

Thus, in this example, for some embodiments, storing the write requests in the block storage of the write tier consumes two IOPS rather than at least five IOPS. Note, in this example, dashed line 1012 represents the logical dividing line between the WAL segment and the payload segment in the write tier.

Figure 11:
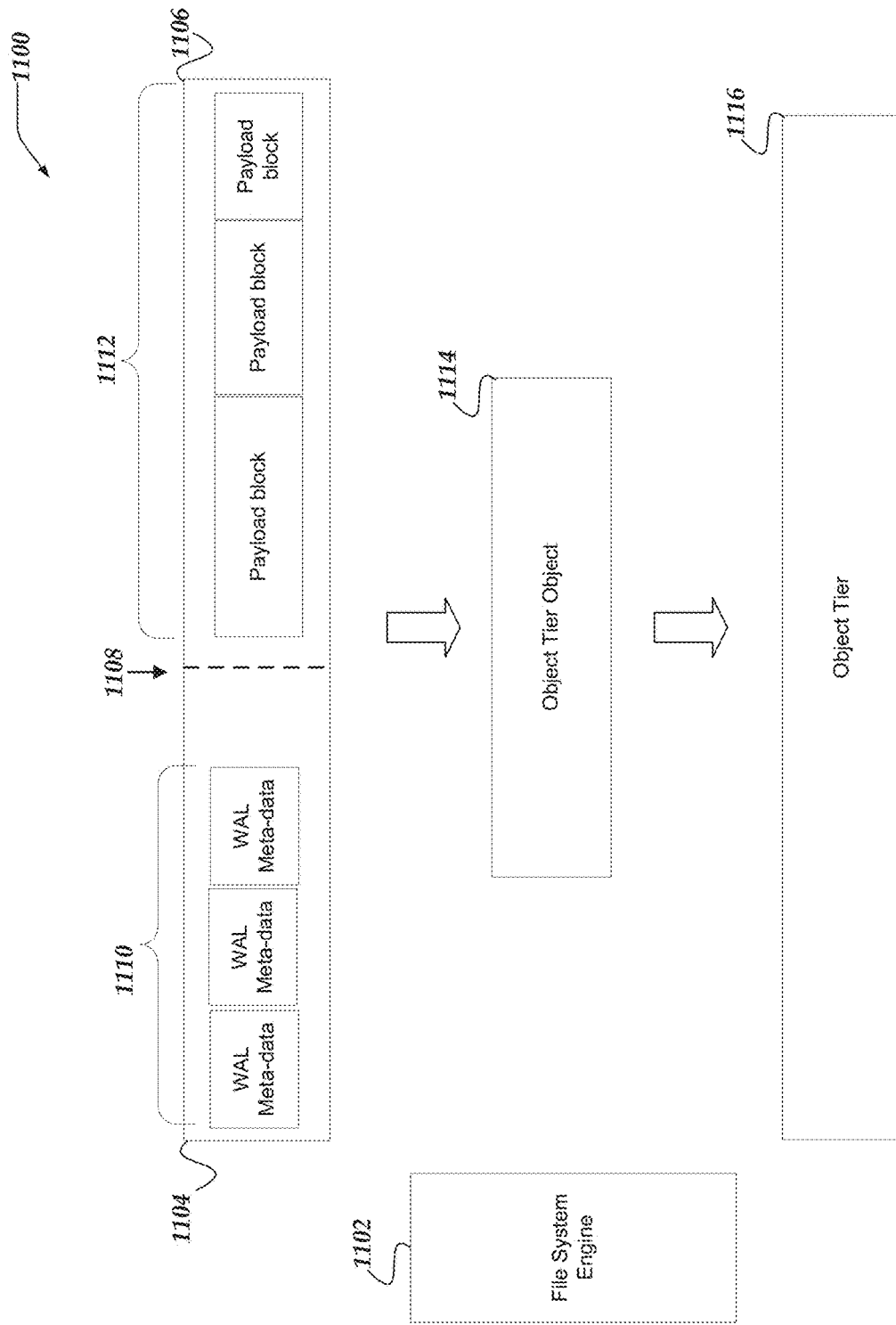
FIG. 11 illustrates a logical schematic of a portion of a file system for tiered data stores with ephemeral and persistent layers in accordance with one or more of the various embodiments.

FIG. 11 illustrates a logical schematic of a portion of file system 1100 for tiered data stores with ephemeral and persistent layers in accordance with one or more of the various embodiments. As described above, in some embodiments, file system engines may be arranged to selectively cache WAL entries as WAL meta-data blocks and payload blocks in a write tier.

Accordingly, in some embodiments, file system engines may be arranged to move WAL meta-blocks and/or payload blocks from the write tier to an object tier. In some embodiments, the particular conditions for determining if to move data from a write tier to an object tier may be based on configurable file system policies. However, in some embodiments, generally, file system engines may be arranged to move WAL entries that include WAL meta-data blocks and payload blocks from the write tier to the object tier to ensure that the write tier may have capacity to perform write caching. In some embodiments, file system engines may be arranged to perform urgent moves if the write tier may be close to running of space for pending or impending write operations. Also, file system engines may be arranged to opportunistically move data from the write tier to the object tier if various conditions are met. In some cases, such conditions may include finding enough movable data to fill an object of a configured size. In some embodiments, file system policies associated with determining if data should be moved from the write tier to the object tier may be referred to as tiering policies. Likewise, actions or operations performed to move data between or among tiers may be referred to as tiering operations.

Accordingly, in some embodiments, tiering policies may be configured to set capacity threshold values or other conditions that may trigger tiering operations. Likewise, in some embodiments, tiering policies may include defining the object sizes, bandwidth allocation, compute resource allocation, or the like, for opportunistic tiering operations. Also, in some embodiments, tiering policies may include rules, conditions, threshold values, or the like, for determining if WAL entries may be eligible for moving from the write tier to the object tier. For example, in some embodiments, tiering policies may define conditions based on the length of time data has been in the write tier, time since last access, or the like. In some embodiments, other conditions may include time-of-day, day-of-week, file system activity, or the like. For example, a file system may be configured to perform opportunistic tiering operations if client activity in the file system falls below a threshold value.

Accordingly, in some embodiments, file system engines may be arranged to monitor one or more metrics to determine if tiering operations should be performed.

In this example, file system engine 1102 may be arranged to determine if tiering operations should occur. Further, in this example, WAL segment 1104 may include one or more WAL meta-data blocks, such as WAL meta-data blocks 1110 and payload segment 1106 may include one or more payload blocks, such as payload blocks 1112. Also, in this example, dashed line 1108 may be considered to represent a logical boundary between WAL segment 1104 and payload segment 1106.

Accordingly, in some embodiments, if the conditions in the file system or the write tier trigger tiering operations, file system 1102 may be arranged to determine one or more WAL meta-data blocks or one or more payload blocks in the write tier to coalesce into an object that may be stored in the object tier. In this example, for some embodiments, object 1114 represents a data structure the includes the one or more WAL entries that may be the subject of the tiering operation. In some embodiments, the size of objects, such as object 1114 may be determined based on file system policy. For example, if there may be advantageous object sizes for the object store system used to provide the object tier, file system engines may be arranged to attempt to match the amount of data moved from the write tier to the advantageous object size.

In some embodiments, the format or organization of the data within the object may vary depending on the object tier. For example, in some embodiments, meta-data, WAL meta-data blocks, or payload blocks may be stored in the object such that the file system may be able interpret the objects while enabling efficient storage of the object in the object store system of the cloud computing provider. Accordingly, in some embodiments, file system engines may be arranged to employ rules, instructions, formats, or the like, provided via configuration information to account for variations between cloud providers, object store systems, object store pricing models, or the like. For example, a first cloud provider may provide a discounted price if the size of objects are kept within a certain range. Likewise, for example, other cloud computing providers may limit the IOPs quota for object storage thus encouraging larger objects over smaller objects.

In this example, for some embodiments, object tier 1116 represents an object tier where file system 1102 may store object 1114.

Also, in some embodiments, tiering operations may include various accounting operations to fixup or update indexes, or other meta-data that may track if data has been moved from the write tier to the object tier.

As described above, in some cases, cloud computing providers may impose access limitations (or charge high prices for exceeding said limitations) on their block storage offerings. Accordingly, in some embodiments, file system engines may be arranged to reduce the number of accesses (IOPS) to the write tier to avoid exceeding the access limits imposed by the cloud computing provider. Accordingly, in some embodiments, file system engines may be arranged to delay collection of data from the write tier to minimize the IOPS associated with the block storage comprising the write tier. See, FIG. 10.

Accordingly, in some embodiments, file system engines may be arranged to employ in-memory indexes, meta-data, or the like, to compute or otherwise determine which WAL meta-data blocks or payload blocks may be moved. In some embodiments, file system engines may be configured to select WAL meta-data blocks that may be contiguous in the WAL segment to enable many WAL meta-data blocks to be read from the write tier at the same time. Likewise, in some embodiments, file system engines may be arranged to determine contiguous payload blocks to enable entire ranges of payload blocks to copy into objects in fewer IOPS than accessing payload blocks individually. Thus, in some embodiments, file system engines may be arranged to move data from the write tier to ensure that the write tier has the necessary capacity to service the needs of the file system without exceeding access limitations that may be imposed on the block storage used for the write tier.

Generalized Operations

FIGS. 12-16 represent generalized operations for tiered data store with ephemeral and persistent layers in accordance with one or more of the various embodiments. In one or more of the various embodiments, processes 1200, 1300, 1400, 1500, and 1600 described in conjunction with FIGS. 12-16 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as those in a cloud-based environment. However, embodiments are not so limited and various combinations of network computers, client computers, or the like may be utilized. Further, in one or more of the various embodiments, the processes described in conjunction with FIGS. 12-16 may perform actions for tiered data store with ephemeral and persistent layers in accordance with at least one of the various embodiments or architectures such as those described in conjunction with FIGS. 1-11. Further, in one or more of the various embodiments, some or all of the actions performed by processes 1200, 1300, 1400, 1500, and 1600 may be executed in part by one or more of file system engine 322, or the like.

Figure 12:
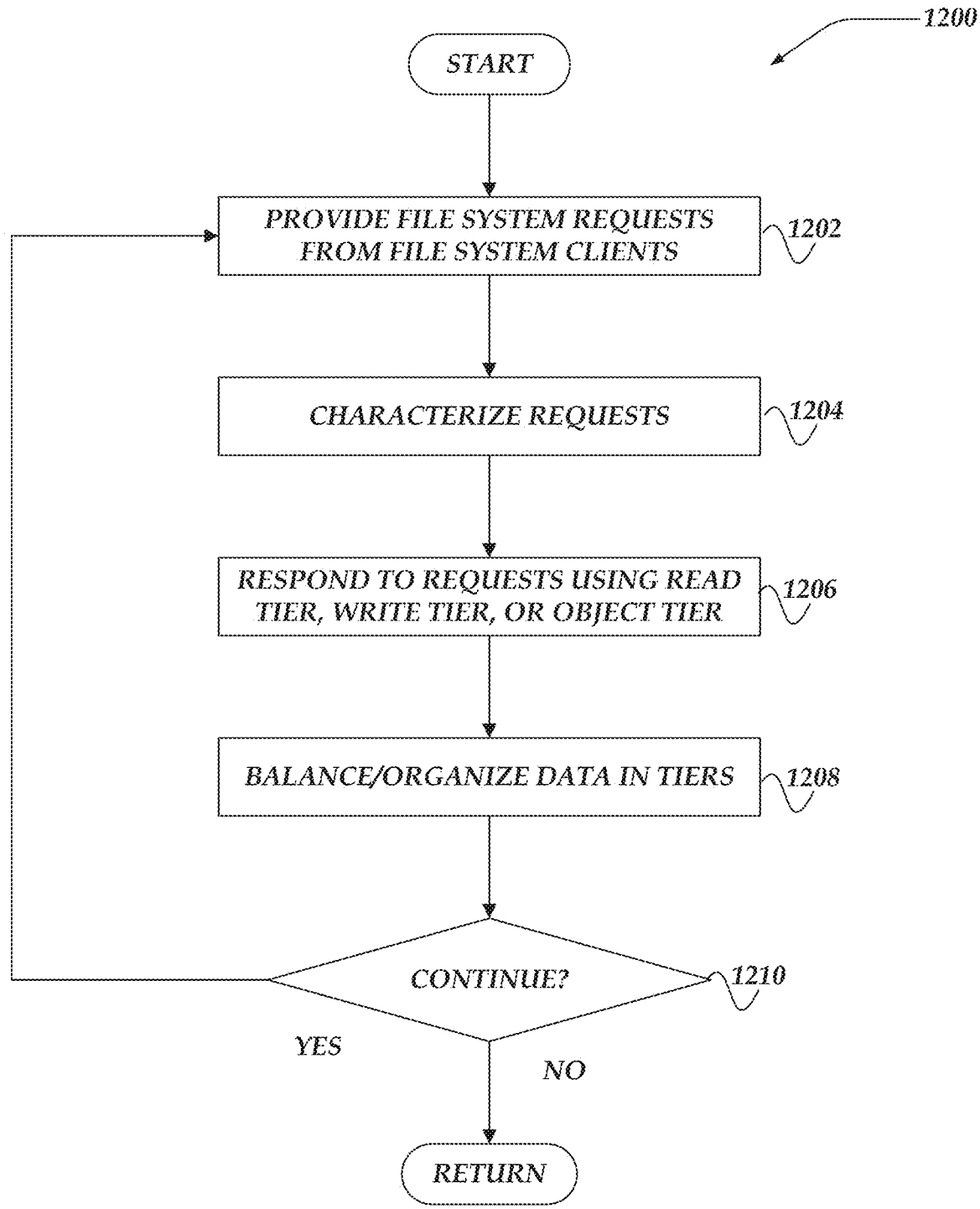
FIG. 12 illustrates an overview flowchart for a process for tiered data store with ephemeral and persistent layers in accordance with one or more of the various embodiments.

FIG. 12 illustrates an overview flowchart for process 1200 for tiered data store with ephemeral and persistent layers in accordance with one or more of the various embodiments. After a start flowchart block, at flowchart block 1202, in one or more of the various embodiments, one or more file system requests from one or more file system clients may be provided. As described above, clients of distributed file system may submit various file system commands, including commands to read data, save data, append data to files, delete data, move data, copy data, or the like. In some cases, from the clients' point of view, data may be files, directories, or other file system items. In some cases, for some embodiments, file system engines may initiate file system-wide command transactions that may comprise one or more requests have a one or more portions of the data associated with a command transaction. Thus, in some embodiments, file system engines may receive requests that include information or data in terms of file system blocks. Accordingly, in some embodiments, requests may include address information, range/span information, or the like, that may associate file system blocks with larger file system items.

At flowchart block 1204, in one or more of the various embodiments, file system engines may be arranged to characterize the one or more requests. In one or more of the various embodiments, file system engines may be arranged to apply one or more file system policies depending on one or more characteristics of the incoming requests. In some embodiments, file system requests may include one or more hints or indications that may inform the file system engines regarding which policy to select. Likewise, in some embodiments, such hints or indications may inform a particular file system policy to perform one or more operations.

At flowchart block 1206, in one or more of the various embodiments, file system engines may be arranged to respond to the one or more requests using one or more a read tier, a write tier, or object tier. In one or more of the various embodiments, requests may generally be categorized as reads or writes such that reads do not alter data while writes may alter data (e.g., add, update, move, copy, or delete). Accordingly, in some embodiments, file system engines may be arranged to execute one or more operations to satisfy each request. In some cases, this may include enforcing caching policies or tiering policies. For example, if a write request is altering data that may be cached in the read tier, the file system engines may invalidate that data in the read tier. Accordingly, in some embodiments, file system read caching policies may determine if the modified data should be reloaded into the read tier. Note, one of ordinary skill in the art will appreciate that file systems may employ a variety of caching algorithms, rate limit strategies, indexing mechanisms, data protection methods, or the like. However, for brevity and clarity a detailed description of such is omitted.

At flowchart block 1208, in one or more of the various embodiments, file system engines may be arranged to balance or organize the data in one or more of the read tier, write tier, or object tier. Generally, in some embodiments, file system engines may be arranged to perform various operations to keep the file system consistent while servicing client requests. In some cases, for some embodiments, file system engines may be arranged to perform some accounting operations before acknowledging (to the requesting client) that all of the requests associated with a transaction have been completed. Note, the particular operations, such as, erasure coding, mirroring, data striping, or other data protection operations may vary depending on the particular file system or the particular configuration of a file system. Accordingly, for brevity and clarity such details are omitted here.

Further, as described above, in some embodiments, the data for some requests associated with the same command transaction may be allocated to different tiers. For example, some write request data may be allocated to a write tier while other write request data may be allocated to an object tier.

At flowchart decision block 1210, in one or more of the various embodiments, as long as the file system remains in operation it may service client requests or tiering operations. Accordingly, in some embodiments, control may loop back to block 1202 unless the file system may be reset or otherwise shutdown.

Next, in one or more of the various embodiments, control may be returned to a calling process.

Figure 13:
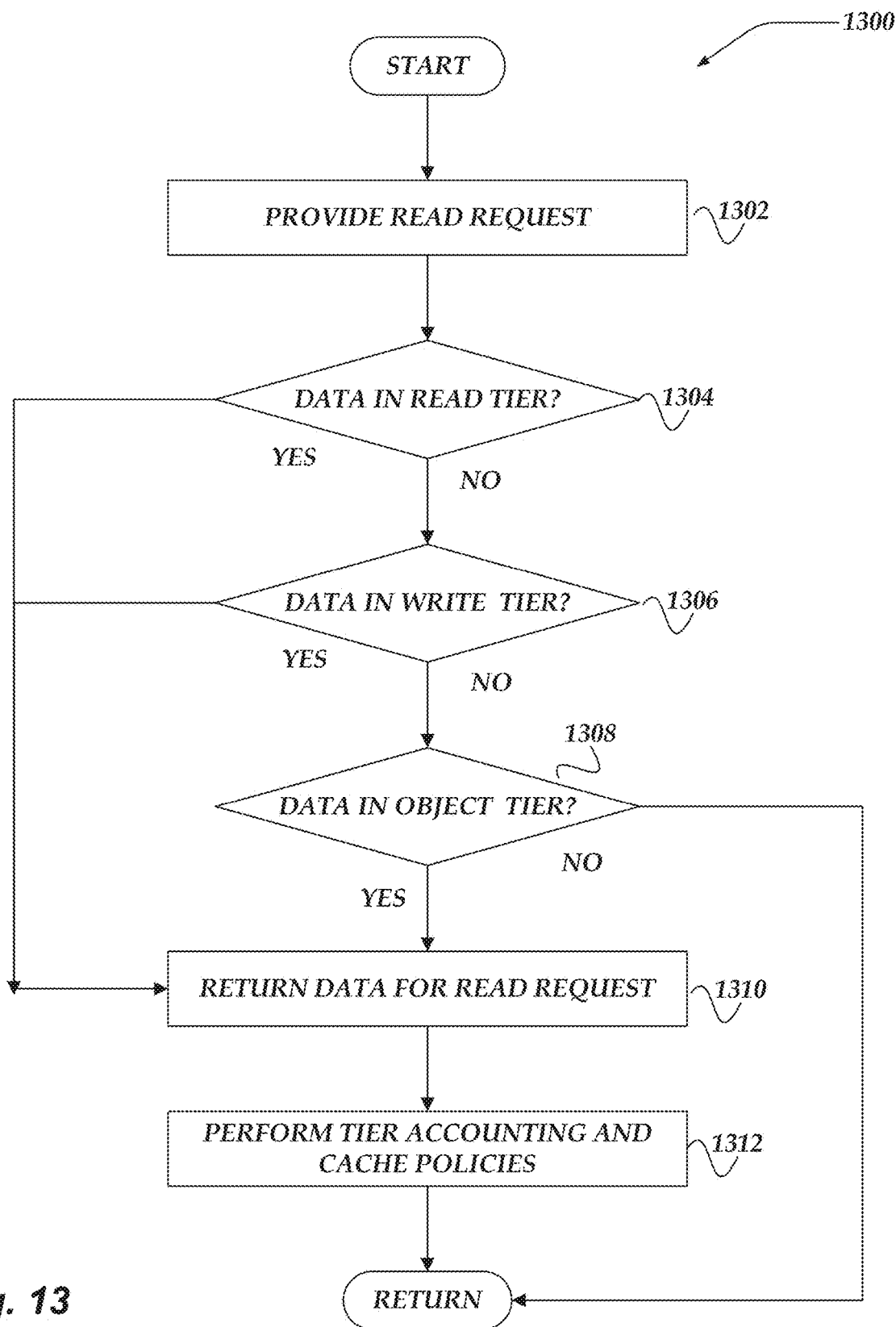
FIG. 13 illustrates a flowchart for a process for tiered data store with ephemeral and persistent layers in accordance with one or more of the various embodiments.

FIG. 13 illustrates a flowchart for process 1300 for tiered data store with ephemeral and persistent layers in accordance with one or more of the various embodiments. After a start flowchart block, at flowchart block 1302, in one or more of the various embodiments, one or more read requests may be provided to the file system. As mentioned above, various clients of the file system may generate various file system commands either directly through a file system interface or by interacting with various applications that may employ the file system for storing data or accessing data. Note, one of ordinary skill in the art will appreciate that various file system subsystems may intervene between the client submitting its commands and the requests being delivered to one or more nodes in the file system. For example, file systems may include one or more indexes or other systems for determining how to distribute one or more requests across the file system nodes to service the transaction. Further, file systems may employ a variety of data protection schemes that may intentionally distribute data across the file system for reliability, or the like. Accordingly, for brevity discussion of striping, erasure coding, mirroring, data distribution rules, protection mechanisms, or the like, is omitted.

At flowchart decision block 1304, in one or more of the various embodiments, if the requested data may be in the read tier, control may flow to flowchart block 1310; otherwise, control may flow to flowchart decision block 1306.

In some embodiments, file system engines may be arranged to check if a valid copy of the requested data may be in the read tier. In some embodiments, read tiers may be considered a read cache such that various caching policies may be employed to determine which data may be kept in the read tier. In some embodiments, data found in the read tier may be considered invalid if there may be fresher versions of the data in the write tier or object tier. In some cases, file system engines may be arranged to perform accounting operations to ensure a representation of which data in the read tier may be valid or invalid.

Note, in some embodiments, read tiers may be comprised of ephemeral storage such that if the storage may be detached from its associated compute instances (e.g., nodes) the data in the read tier may be lost. Accordingly, in some embodiments, if data may be in the read tier, there will be a persistent copy of the data in either the write tier or the object tier. Further, in some embodiments, data in the read tier may be read-only copies of data that is located in persistent storage (e.g., write tier or object tier) elsewhere in the file system.

At flowchart decision block 1306, in one or more of the various embodiments, if the requested data may be in the write tier, control may flow to flowchart block 1310; otherwise, control may flow to flowchart decision block 1308.

In some embodiments, if valid copies of the requested data may be absent from the read tier, file system engines may examine the write tier to determine if there may be one or more WAL entries that covers the data being requested. Accordingly, in some embodiments, file system engines may be arranged to scan the information included in the WAL meta-data blocks to determine if there may be transactions that include the data being requested by the read request. As described above, in some embodiments, WAL meta-data blocks may include a list of data structures that store which addresses or address ranges may correspond to the various data in associated payload blocks. Accordingly, in some embodiments, file system engines may be arranged to seek the most recent data that covers the range of data requested by the client.

In some cases, for some embodiments, WAL entries may include data is stored in the object tier rather than in the payload segment of the write tier. Accordingly, in some embodiments, in some cases, WAL meta-data blocks responsive to the read request may include references to data stored in an object in the object tier. In such cases, the write tier cannot return that data and the object tier must instead return that data.

At flowchart decision block 1308, in one or more of the various embodiments, if the requested data may be in the object tier, control may flow to flowchart block 1310; otherwise, control may be returned to a calling process. In some embodiments, file system engines may be arranged to check if the object tier includes the data requested by the client. In some embodiments, object tiers may be arranged to include indexes, maps, tables, binary trees, or the like, for rapidly determining if the requested data may be included in one or more objects stored in the object tier. Note, for brevity and clarity a detailed discussion of how file system engines may determine if the requested data may be in the object tier is omitted. However, one of ordinary skill in the art will appreciate that various indexing systems, object store APIs, or the like, may be employed to determine if the requested data may be included in an object in object tier. For example, object store features such as object naming, object meta-data fields, or the like, may be employed to indicate address ranges, object size, or the like, to determine which object may include the requested data. Likewise, in some embodiments, some or all objects may be arranged to include internal indexes at known offset in the objects. Accordingly, in some embodiments, these internal indexes may be examined to determine if requested data may be included in a given object in the object store.

In some embodiments, if the data for the read request may not be found in the object tier, the file system may return a "data not found" message, or the like, to the request client.

At flowchart block 1310, in some embodiments, file system engines may be arranged to return the requested data to the requesting clients. In some embodiments, if the requested data may be found, the file system may return the requested data to the requested client.

At flowchart block 1312, in one or more of the various embodiments, file system engines may be arranged to perform one or more tier accounting operations or execute one or more cache policies associated with the read requests. In some embodiments, file systems may be arranged to track which blocks are read, when they are read, or the like. Accordingly, in some embodiments, this type of information may be applied to one or more read cache policies to determine if data associated with a request should be promoted to the read tier or evicted from the read tier.

Next, in one or more of the various embodiments, control may be returned to a calling process.

Figure 14:
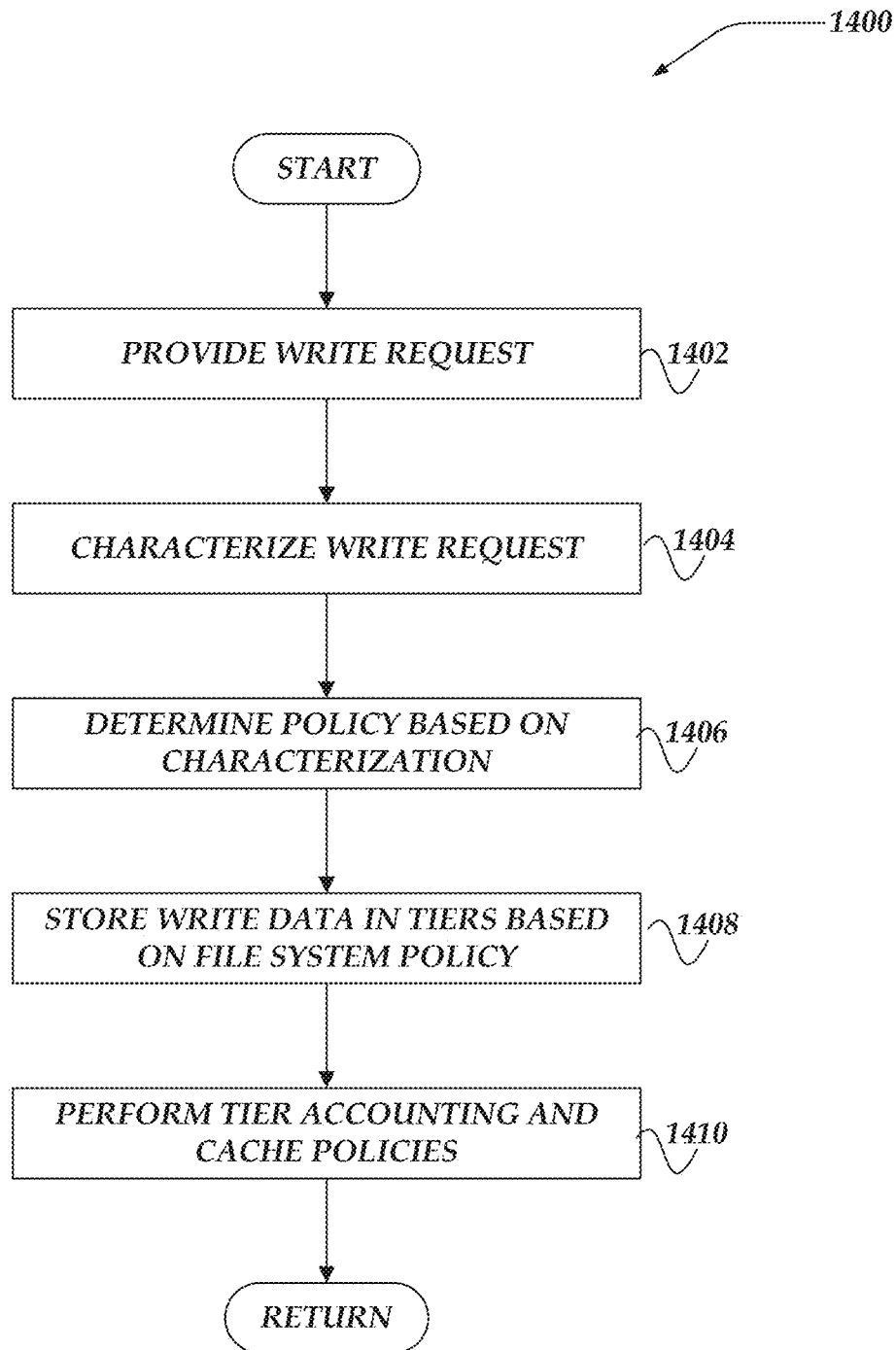
FIG. 14 illustrates a flowchart for a process for tiered data store with ephemeral and persistent layers in accordance with one or more of the various embodiments.

FIG. 14 illustrates a flowchart for process 1400 for tiered data store with ephemeral and persistent layers in accordance with one or more of the various embodiments. After a start flowchart block, at flowchart block 1402, in one or more of the various embodiments, one or more write requests may be provided to the file system.

As mentioned above, various clients of the file system may generate various file system transactions either directly through a file system interface or by interacting with various applications that may employ the file system for storing data or accessing data. Note, one of ordinary skill in the art will appreciate that various file system subsystems may intervene between the client submitting its commands and the requests being delivered to one or more nodes in the file system. For example, file systems may include one or more indexes or other systems for determining which file system node may service the request. Further, file systems may employ a variety of data protection schemes that may intentionally distribute data across the file system for reliability, or the like. Accordingly, for brevity discussion of striping, erasure coding, data distribution rules, data protection mechanisms, or the like, is omitted.

At flowchart block 1404, in one or more of the various embodiments, file system engines may be arranged to characterize the one or more write requests. In one or more of the various embodiments, file system engines may be arranged to apply one or more file system policies depending on one or more characteristics of the incoming requests. In some embodiments, file system requests may include one or more hints or indications that may inform the file system engines regarding which policy to select. Likewise, in some embodiments, such hints or indication may inform a particular file system policy to perform one or more operations.

At flowchart block 1406, in one or more of the various embodiments, file system engines may be arranged to determine a tiering policy based on the characterization of the one or more write requests. Accordingly, in some embodiments, tier policies may be configured to determine if incoming write data should be written to the write tier or the object tier.

Also, in some embodiments, some tiering policies may be configured to store some of the data blocks associated with file system items to the write tier while leaving the remainder in the object tier. For example, if the write requests may be appending data to the tail end of a file in the file system, the data blocks that store the meta-data for the file may be stored in the write tier while the bulk of the data blocks associated with the file may be stored directly in the object tier. Further, in this example, for some embodiments, as blocks are provided for appending, the file system engine may send some or all of the blocks directly to the object tier while the data blocks that include meta-data of the file remain in the write tier so they may be efficiently updated during the pending append operations. For example, meta-data such as file size may be updated in the write tier as data for the file is stored directly in the object tier.

Note, in some embodiments, file system engines may be arranged to provide user interfaces or other interfaces that enable users, administrators, or the like, to set particular tiering policies to account for local requirements or local circumstances. For example, in some cases, file system administrators may configure tiering policies to optimize for price (of cloud storage) over performance or vice versa.

Also, in some embodiments, tiering policies may be adapted to performance or cost characteristics of particular cloud computing providers or cloud computing environments. One of ordinary skill in the art will appreciate that determining the most beneficial tiering policies may depend on the particular cloud computing provider, organization goals/priorities, or the like. Accordingly, in some embodiments, file system engines may be arranged to determine tiering policies based on configuration information.

At flowchart block 1408, in one or more of the various embodiments, file system engines may be arranged to store the write data in one or more tiers based on the tiering policy. In some embodiments, the incoming data may be stored in the write tier or the object tier.

In some embodiments, file system engines may be arranged to determine how many write requests may be bundled into a WAL entry based on block storage IOPS considerations. For example, if the rate of write requests may cause the IOPS limit of the cloud computing environment block storage to be exceeded, the file system engine may buffer two or more write requests into a single WAL entry that includes a WAL meta-data block and a payload block that may be stored in the write tier in two I/O operations. In some embodiments, one I/O operation may be executed to store the payload blocks to the payload segment of the write tier. And, in some embodiments, one I/O operation may be executed to store the corresponding WAL meta-data block in the WAL segment of the write tier.

Also, in some embodiments, in some cases, one or more portions of the write data may be stored in the write tier while other portions of the write data may be stored in object tier.

Note, one of ordinary skill in the art will appreciate that file systems may provide various subsystems that may provide one or more features common to many file systems, such as, erasure coding, mirroring, data striping, encryption, or other data protection operations. However, for brevity and clarity a detailed description of such operations are omitted here.

At flowchart block 1410, in one or more of the various embodiments, file system engines may be arranged to execute one or more tier accounting operations or one or more cache operations based on the tiering policy or file system policies.

In one or more of the various embodiments, file systems may be arranged to include one or more indexes, binary trees, system meta-data, performance tracking metrics, or other data structures that contribute to providing a general purpose file system. Accordingly, in some embodiments, file system engines may update these components to enable the write data to be managed in the file system. Also, the details of these data structures or accounting systems may be considered outside of the scope of this disclosure. Accordingly, for brevity and clarity such details are omitted here.

Next, in one or more of the various embodiments, control may be returned to a calling process.

Figure 15:
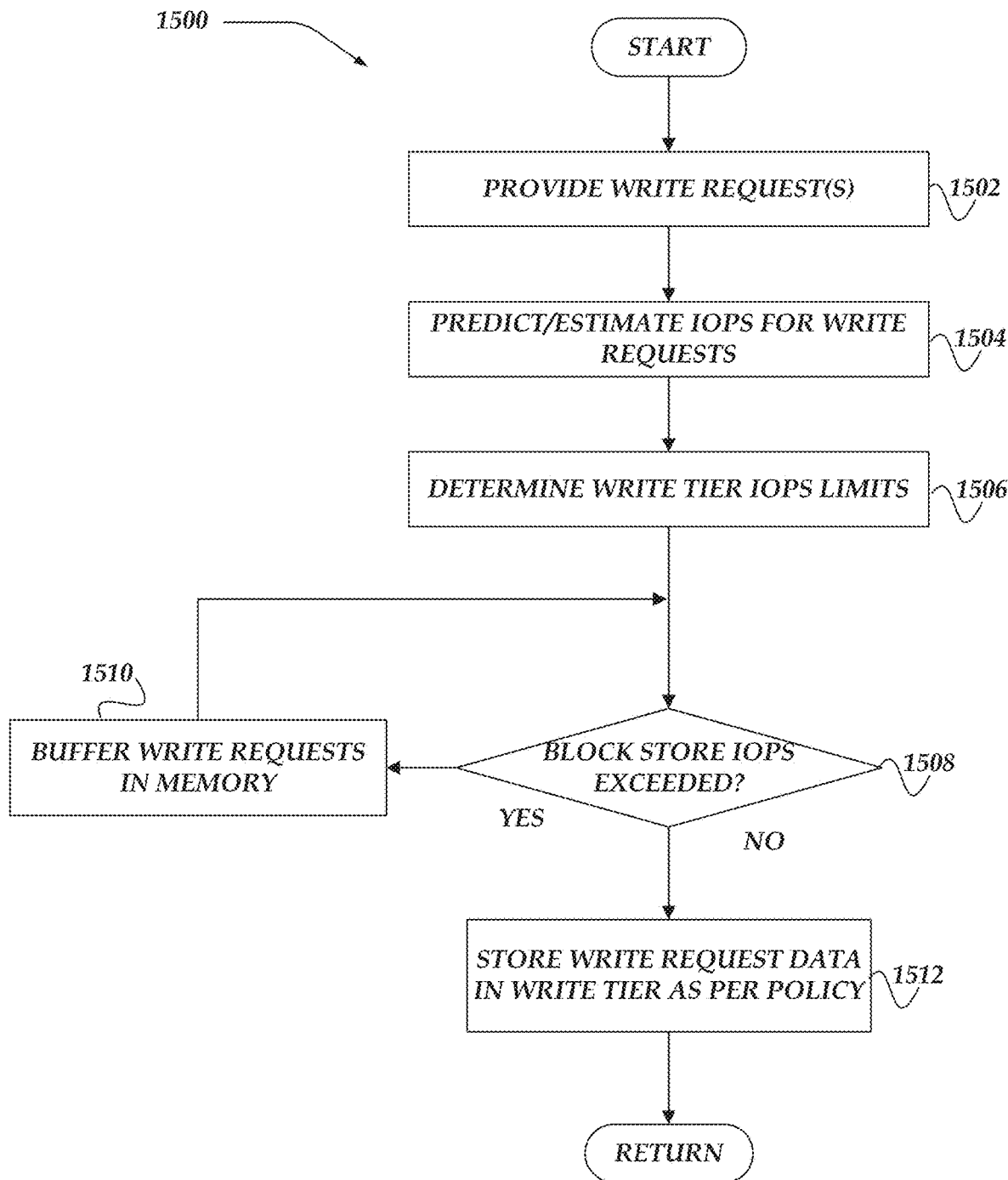
FIG. 15 illustrates a flowchart for a process for tiered data store with ephemeral and persistent layers in accordance with one or more of the various embodiments.

FIG. 15 illustrates a flowchart for process 1500 for tiered data store with ephemeral and persistent layers in accordance with one or more of the various embodiments. After a start flowchart block, at flowchart block 1502, in one or more of the various embodiments, one or more write requests may be provided to the file system. As described above, one or more file system clients may be providing file system write commands that may be resolved by various requests to store data in the file system. In some embodiments, write requests may include meta-data such as, size of write (e.g., number of blocks), rate of write requests, location of write data, quality-of-service (QoS) indicators, priority indicators, or the like.

At flowchart block 1504, in one or more of the various embodiments, file system engines may be arranged to predict (estimate) the IOPS that may be associated with incoming write requests. In some embodiments, file system engines may be arranged to execute one or more predictive models to estimate the IOPS or other performance metrics that may be associated with incoming write requests. For example, in some embodiments, file system engines may be configured to estimate the IOPS for processing the incoming write requests based on the rate of receiving write requests, size of requests, or the like. In some embodiments, predictive models may be arranged to provide different IOPS estimates depending on the characterization of the incoming requests. For example, in some embodiments, keeping IOPS below a configured threshold value may reduce cloud computing environment costs for the file system operator or users. However, in some embodiments, some types of write requests may be enabled to exceed IOPS limits for other policy reasons, such as, request priority, client application activity classification, or the like. Likewise, in some embodiments, file system operators may determine additional IOPS policies based on experimentation, observation, customer/user preferences, or the like. Thus, in some embodiments, file system engines may be arranged to determine the particular IOPS related policies based on rules, instructions, or the like, via configuration information to account for local requirements or local circumstances.

At flowchart block 1506, in one or more of the various embodiments, file system engines may be arranged to determine IOPS limits for the write tier. In some embodiments, determining the IOPS limits may involve looking up a defined threshold value. In some cases, the IOPS limits may be determined by configuration information, obtained via a cloud computing environment API, or the like. In some embodiments, an IOPS limit may be a soft limit such that the limit may be exceeded at the expense of increased cloud computing environment fees.

At flowchart decision block 1508, in one or more of the various embodiments, if the write requests may exceed the IOPS limit for the write tier, control may flow to flowchart block 1510; otherwise, control may flow to flowchart block 1512.

At flowchart block 1510, in one or more of the various embodiments, file system engines may be arranged to buffer one or more of the write requests in memory. In some embodiments, file system engines may be arranged to provide one or more memory buffers that may be employed to queue write requests. For example, if the IOPS limit may be 3000 (I/O operations per second) and the file system engine predicts that received write requests would require 15000, the file system engine may be configured to consolidate at least 5 incoming write requests or write request I/O operations into 1 write tier I/O operation. Accordingly, in some embodiments, file system engines may be arranged to introduce client latency as needed to ensure the write IOPS do not exceed the configured write tier IOPS limit.

In some embodiments, from the point of view of the client/user, write operations may be delayed by introducing increased latency. However, in some embodiments, the disadvantages of the delay may be offset by reduced cost for cloud computing environment block storage access. Note, as mentioned above, there may be occasions where the block storage IOPS may be exceeded depending on the file system policies. For example, a user may be willing to pay more to increase the block storage IOPS limit or otherwise exceed a prescribed limit.

In some embodiments, if write requests may be buffered, control may loop back to flowchart decision block 1508.

At flowchart block 1512, in one or more of the various embodiments, file system engines may be arranged to store the one or more write requests in the write tier. In some embodiments, file system engines may be arranged to coalesce multiple write requests into a single request. In some embodiments, file system engines may be arranged to generate one or more WAL entries that include a WAL meta-data and payload blocks for sending to the block storage of the write tier. In some embodiments, a single WAL meta-data block and payload block pair may be generated for multiple write requests. Accordingly, in some embodiments, the WAL meta-data block may include meta-data entries that correspond to the individual write requests that may be coalesced. Likewise, in some embodiments, a payload block comprised of the data for multiple write requests may be generated.

Accordingly, in some embodiments, file system engines may consume an IOP to store the payload block in the payload segment of the write tier. Likewise, file system engines may be arranged to consume another IOP to store the WAL meta-data block in the WAL segment of the write tier. For example, in some embodiments, if the queue is holding ten write requests, coalescing them into a single WAL meta-data block and payload block may reduce the required write tier IOPS to two IOPS rather than requiring twenty IOPS.

Note, one of ordinary skill in the art will appreciate that the number of write requests that may be queued may be depending on the amount of available memory (RAM), performance/latency guarantees, or the like. Accordingly, in some embodiments, file system engines may be arranged to determine the particular balance of queue write requests to coalescing operations based on rules, instructions, or the like, provided via configuration information to account for local requirements or local circumstances.

Next, in one or more of the various embodiments, control may be returned to a calling process.

Figure 16:
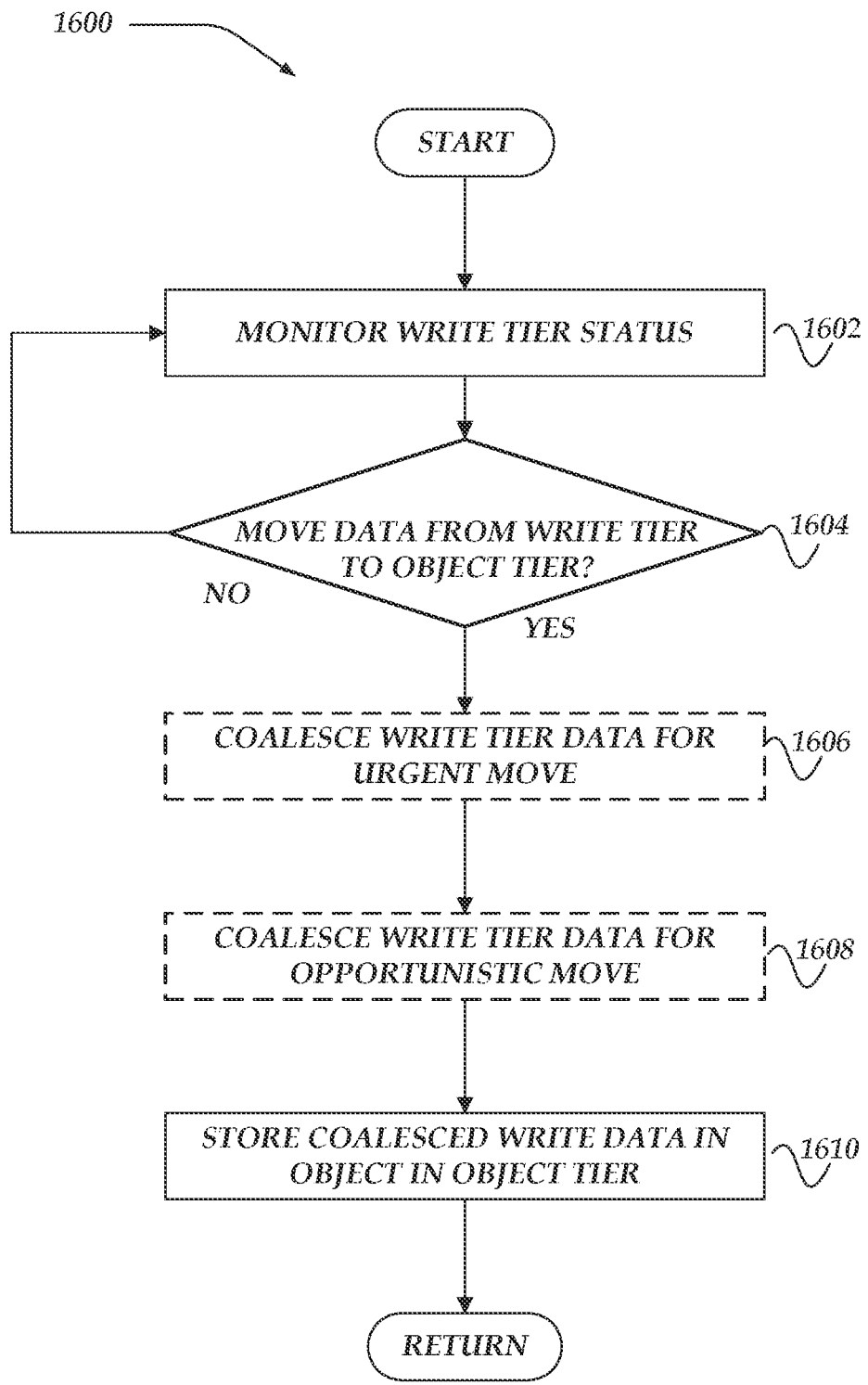
FIG. 16 illustrates a flowchart for a process for tiered data store with ephemeral and persistent layers in accordance with one or more of the various embodiments.

FIG. 16 illustrates a flowchart for process 1600 for tiered data store with ephemeral and persistent layers in accordance with one or more of the various embodiments. After a start flowchart block, at flowchart block 1602, in one or more of the various embodiments, file system engines may be arranged to monitor the status of one or more write tiers. As described above, in some embodiments, write tiers may be comprised of a fixed size WAL segment and a fixed size payload segment. Accordingly, in some embodiments, file system engines may be arranged to monitor the available capacity of the two write tier segments.

In some embodiments, file system engines may be arranged to monitor one or more metrics, such as, current available space, average/predicted write request rate, average/predicted write request size, or the like.

At flowchart decision block 1604, in one or more of the various embodiments, if data may be moved from the write tier to the object tier, control may flow to flowchart block 1606; otherwise, control may loop back to block 1602. In some embodiments, file system engines may be arranged to employ one or more tier policies to determine if data should be moved from the write tier to the object tier. In general, such policies may be directed towards ensuring that the write tier has space available to process incoming write requests. Accordingly, in some embodiments, if the write tier may be at risk of using up available storage space, file system engines may be arranged to execute a tiering operation to clear space in the write tier.

Note, in some embodiments, WAL segments or payload segments may independently run out of space. For example, a few WAL meta-data blocks stored in the WAL segments may be associated with many file system data blocks such that the payload segment may reach capacity limits while the WAL segment has sufficient room. Likewise, in some embodiments, a WAL segment may be in danger of reaching capacity limits while its corresponding payload segment may have available capacity. Thus, in some embodiments, the available block storage space of each segment may be evaluated separately to determine if a tiering operation should be initiated.

Generally, in some embodiments, file system engines may be arranged to coalesce write tier data into one or more objects that may be stored in the object tier.

At flowchart block 1606, in one or more of the various embodiments, optionally, file system engines may be arranged to coalesce data from the write tier for an urgent move.

In one or more of the various embodiments, urgent tiering operations may be initiated if the current usage patterns indicate that the WAL segment or payload segment of a write tier may be in danger of reaching maximum capacity. Accordingly, in some embodiments, file system engines may be arranged to determine one or more WAL meta-blocks and one or more corresponding payload blocks that may be coalesced.

Accordingly, in some embodiments, file system engines may be arranged to examine scan WAL meta-data blocks in the WAL segment to determine if one or more of them may be eligible for moving to the object tier. Also, in some embodiments, file system engines may be arranged to scan the payload segments for the one or more payload blocks that may be associated with the determined WAL meta-data blocks. In some embodiments, file system engines may be configured to prioritize moving older WAL entries over newer WAL entries. However, in some cases, for some embodiments, tiering policies may declare one or more strategies or conditions for selecting, ordering, or prioritizing which WAL entries (WAL meta-data blocks and associated payload blocks) to move.

At flowchart decision block 1608, in one or more of the various embodiments, optionally, file system engines may be arranged to coalesce data from the write for an opportunistic move. In some embodiments, file systems may be configured to have a particular target object size. Thus, in some embodiments, if the number of WAL meta-data blocks or payload blocks eligible for moving to the object tier may approach the configured object size, file system engines may initiate an opportunistic move. Also, in some embodiments, tiering policies may include additional conditions, such as current file system utilization, bandwidth considerations, other pending file system maintenance/administrative operations, or the like, that may be considered to determine if opportunistic moves may be initiated.

At flowchart block 1610, in one or more of the various embodiments, file system engines may be arranged to store the coalesced write data in one or more objects that may be stored in the object tier. In some embodiments, file system engines may be arranged to organize one or more data structures associated with the move before executing I/O operations directed to the block storage of the write tier or the object storage of the object tier. Accordingly, in some embodiments, the number of IOPS for the write tier and the object tier may be reduced.

In some embodiments, file system engines may be arranged to employ one or more indexes or other accounting data structures to determine which WAL meta-data blocks or payload blocks should be moved absent reading the data from the write tier. Accordingly, in some embodiments, a contiguous selection of WAL meta-data blocks may be read from the WAL segment in one I/O operation. Likewise, a contiguous selection of corresponding payload blocks may be read from the payload segment in an I/O operation.

Accordingly, in some embodiments, file system engines may be arranged to organize the data from the write tier into an object format that conforms to the target object store. In some embodiments, the object format may include features such as indexes, or the like, that enable the file system to efficiently determine if the object is storing file system blocks in particular address ranges absent brute force scanning of the object.

In some embodiments, if file system engines have organized the data from the write tier into a formatted object, the formatted object may be submitted to the cloud computing environment to store it in the object store. Note, one of ordinary skill in the art will appreciate the different cloud computing providers may provide different or distinct APIs or other requirements for formatting or manipulating objects. Accordingly, in some embodiments, file system engines may be arranged to employ rules, instructions, or the like, provided via configuration information.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions.

The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:
    determining a write tier in the file system for storing data associated with one or more write requests from one or more file system clients based on location information associated with the one or more write requests, wherein the file system includes the write tier and an object tier;
    predicting a value for a performance metric that corresponds to the one or more write requests based on one or more characteristics of the one or more write requests, wherein the performance metric is determined based on a plurality of interactions with the write tier; and
    employing the predicted value that exceeds a threshold value of the performance metric to cause performance of further actions, including:
        queuing a portion of the one or more write requests in a memory buffer that is separate from the write tier based on the predicted value and the threshold value;
        combining the queued portion of the one or more write requests into one or more data segments; and
        storing the one or more data segments in the write tier, wherein a measured value of the performance metric is less than the threshold value, and wherein the measured valued is associated with storing the one or more data segments in the write tier.

2. The method of claim 1, wherein combining the portion of the one or more write requests further comprises:
    generating one or more Write Ahead Log (WAL) meta-data blocks and one or more payload blocks based on the queued portion of the one or more write requests, wherein the data associated with the queued portion of the write requests is included in the one or more payload blocks, and wherein meta-data associated with the one or more payload blocks is included in the one or more WAL meta-data blocks; and
    including the one or more WAL meta-data blocks and the one or more payload blocks in the one or more data segments.

3. The method of claim 1, wherein storing the one or more data segments, further comprises:
    storing one or more payload blocks included in the one or more data segments in a payload segment of the write tier; and
    storing one or more Write Ahead Log (WAL) meta-data blocks included in the one or more data segments in a WAL segment of the write tier.

4. The method of claim 1, wherein predicting the value for the performance metric, further comprises:
    predicting an input-output-operations-per-second (IOPS) value associated with interactions with the write tier based on one or more characteristics of the one or more write requests.

5. The method of claim 1, wherein determining the write tier in the file system for storing data associated with one or more write requests, further comprises:
    determining one or more portions of data associated with the one or more write requests to store in the object tier, wherein storing the one or more portions of data in the object tier bypasses the write tier.

6. The method of claim 1, further comprising:
    monitoring an amount of available storage space in the write tier; and
    in response to the amount of available storage space being less than threshold value, causing performance of other further actions, including:
        combining one or more WAL meta-data blocks and one or more payload blocks stored in the one or more data segments into one or more objects; and
        storing the one or more objects in the object tier to increase the available space in the write tier.

7. The method of claim 1, further comprising:
    employing a cloud-based block storage service to provide capacity to store data for the write tier.

8. The method of claim 1, further comprising:
    determining a read tier in the file system that is storing a portion of the data associated with the one or more write requests; and
    invalidating or updating the portion of the data in the read tier.

9. A system for managing data in a file system comprising:
    a network computer, comprising:
        a memory that stores at least instructions; and
        one or more processors that execute instructions that are configured to cause performance of actions, including:
            determining a write tier in the file system for storing data associated with one or more write requests from one or more file system clients based on location information associated with the one or more write requests, wherein the file system includes the write tier and an object tier;
            predicting a value for a performance metric that corresponds to the one or more write requests based on one or more characteristics of the one or more write requests, wherein the performance metric is determined based on a plurality of interactions with the write tier; and
            employing the predicted value that exceeds a threshold value of the performance metric to cause performance of further actions, including:
                queuing a portion of the one or more write requests in a memory buffer that is separate from the write tier based on the predicted value and the threshold value;
                combining the queued portion of the one or more write requests into one or more data segments; and
                storing the one or more data segments in the write tier, wherein a measured value of the performance metric is less than the threshold value, and wherein the measured valued is associated with storing the one or more data segments in the write tier; and
one or more client computers, comprising:
a memory that stores at least instructions; and
one or more processors that execute instructions that are configured to cause performance of other actions, including:
providing the one or more write requests to the file system.

10. The system of claim 9, wherein combining the portion of the one or more write requests further comprises:
generating one or more Write Ahead Log (WAL) meta-data blocks and one or more payload blocks based on the queued portion of the one or more write requests, wherein the data associated with the queued portion of the write requests is included in the one or more payload blocks, and wherein meta-data associated with the one or more payload blocks is included in the one or more WAL meta-data blocks; and
including the one or more WAL meta-data blocks and the one or more transaction blocks in the one or more data segments.

11. The system of claim 9, wherein storing the one or more data segments, further comprises:
storing one or more payload blocks included in the one or more data segments in a payload segment of the write tier; and
storing one or more Write Ahead Log (WAL) meta-data blocks included in the one or more data segments in a WAL segment of the write tier.

12. The system of claim 9, wherein predicting the value for the performance metric, further comprises:
predicting an input-output-operations-per-second (IOPS) value associated with interactions with the write tier based on one or more characteristics of the one or more write requests.

13. The system of claim 9, wherein determining the write tier in the file system for storing data associated with one or more write requests, further comprises:
determining one or more portions of data associated with the one or more write requests to store in the object tier, wherein storing the one or more portions of data in the object tier bypasses the write tier.

14. The system of claim 9, wherein the one or more network computer processors execute instructions that are configured to cause performance of actions, further comprising:
monitoring an amount of available storage space in the write tier; and
in response to the amount of available storage space being less than threshold value, causing performance of other further actions, including:
combining one or more other payload segments stored in the write tier into one or more objects; and
storing the one or more objects in an object tier, wherein the amount of available storage space in the write tier is increased based on a size of the one or more objects.

15. The system of claim 9, wherein the one or more network computer processors execute instructions that are configured to cause performance of actions, further comprising:
employing a cloud-based block storage service to provide capacity to store data for the write tier.

16. The system of claim 9, wherein the one or more network computer processors execute instructions that are configured to cause performance of actions, further comprising:
determining a read tier in the file system that is storing a portion of the data associated with the one or more write requests; and
invalidating the portion of the data in the read tier.

17. A processor readable non-transitory storage media that includes instructions for managing data in a file system over a network, wherein execution of the instructions by one or more processors on one or more network computers performs actions, comprising:
determining a write tier in the file system for storing data associated with one or more write requests from one or more file system clients based on location information associated with the one or more write requests, wherein the file system includes the write tier and an object tier;
predicting a value for a performance metric that corresponds to the one or more write requests based on one or more characteristics of the one or more write requests, wherein the performance metric is determined based on a plurality of interactions with the write tier; and
employing the predicted value that exceeds a threshold value of the performance metric to cause performance of further actions, including:
queuing a portion of the one or more write requests in a memory buffer that is separate from the write tier based on the predicted value and the threshold value;
combining the queued portion of the one or more write requests into one or more data segments; and
storing the one or more data segments in the write tier, wherein a measured value of the performance metric is less than the threshold value, and wherein the measured valued is associated with storing the one or more data segments in the write tier.

18. The media of claim 17, wherein combining the portion of the one or more write requests further comprises:
generating one or more Write Ahead Log (WAL) meta-data blocks and one or more payload blocks based on the queued portion of the one or more write requests, wherein the data associated with the queued portion of the write requests is included in the one or more payload blocks, and wherein meta-data associated with the one or more payload blocks is included in the one or more WAL payload blocks; and
including the one or more WAL meta-data blocks and the one or more payload blocks in the one or more data segments.

19. The media of claim 17, wherein storing the one or more data segments, further comprises:
storing one or more transaction blocks included in the one or more data segments in a payload segment of the write tier; and
storing one or more Write Ahead Log (WAL) blocks included in the one or more data segments in a WAL segment of the write tier.

20. The media of claim 17, wherein predicting the value for the performance metric, further comprises:
predicting an input-output-operations-per-second (IOPS) value associated with interactions with the write tier based on one or more characteristics of the one or more write requests.

21. The media of claim 17, wherein determining the write tier in the file system for storing data associated with one or more write requests, further comprises:

determining one or more portions of data associated with the one or more write requests to store in the object tier, wherein storing the one or more portions of data in the object tier bypasses the write tier.

22. The media of claim 17, further comprising:
monitoring an amount of available storage space in the write tier; and
in response to the amount of available storage space being less than threshold value, causing performance of other further actions, including:
combining one or more other payload segments stored in the write tier into one or more objects; and
storing the one or more objects in an object tier, wherein the amount of available storage space in the write tier is increased based on a size of the one or more objects.

23. The media of claim 17, further comprising:
employing a cloud-based block storage service to provide capacity to store data for the write tier.

24. A network computer for managing data in a file system, comprising:
a memory that stores at least instructions; and
one or more processors that execute instructions that are configured to cause performance of actions, including:
determining a write tier in the file system for storing data associated with one or more write requests from one or more file system clients based on location information associated with the one or more write requests, wherein the file system includes the write tier and the object tier;
predicting a value for a performance metric that corresponds to the one or more write requests based on one or more characteristics of the one or more write requests, wherein the performance metric is determined based on a plurality of interactions with the write tier; and
employing the predicted value that exceeds a threshold value of the performance metric to cause performance of further actions, including:
queuing a portion of the one or more write requests in a memory buffer that is separate from the write tier based on the predicted value and the threshold value;
combining the queued portion of the one or more write requests into one or more data segments; and
storing the one or more data segments in the write tier, wherein a measured value of the performance metric is less than the threshold value, and wherein the measured valued is associated with storing the one or more data segments in the write tier.

25. The network computer of claim 24, wherein combining the portion of the one or more write requests further comprises:

generating one or more Write Ahead Log (WAL) meta-data blocks and one or more payload blocks based on the queued portion of the one or more write requests, wherein the data associated with the queued portion of the write requests is included in the one or more payload blocks, and wherein meta-data associated with the one or more payload blocks is included in the one or more WAL meta-data blocks; and
including the one or more WAL meta-data blocks and the one or more payload blocks in the one or more data segments.

26. The network computer of claim 24, wherein storing the one or more data segments, further comprises:
storing one or more payload blocks included in the one or more data segments in a payload segment of the write tier; and
storing one or more Write Ahead Log (WAL) blocks included in the one or more data segments in a WAL segment of the write tier.

27. The network computer of claim 24, wherein predicting the value for the performance metric, further comprises:
predicting an input-output-operations-per-second (IOPS) value associated with interactions with the write tier based on one or more characteristics of the one or more write requests.

28. The network computer of claim 24, wherein determining the write tier in the file system for storing data associated with one or more write requests, further comprises:
determining one or more portions of data associated with the one or more write requests to store in the object tier, wherein storing the one or more portions of data in the object tier bypasses the write tier.

29. The network computer of claim 24, wherein the one or more processors execute instructions that are configured to cause performance of actions, further comprising:
monitoring an amount of available storage space in the write tier; and
in response to the amount of available storage space being less than threshold value, causing performance of other further actions, including:
combining one or more other payload segments stored in the write tier into one or more objects; and
storing the one or more objects in an object tier, wherein the amount of available storage space in the write tier is increased based on a size of the one or more objects.

30. The network computer of claim 24, wherein the one or more processors execute instructions that are configured to cause performance of actions, further comprising:
employing a cloud-based block storage service to provide capacity to store data for the write tier.

* * * * *